(12) United States Patent
Naujok et al.

(10) Patent No.: US 12,238,084 B2
(45) Date of Patent: Feb. 25, 2025

(54) SINGLE-EXCHANGE AUTHENTICATION OF A COMMUNICATIONS DEVICE

(71) Applicant: Prove Identity, Inc., New York, NY (US)

(72) Inventors: Jeffrey Robert Naujok, Colorado Springs, CO (US); Alan Switzer, Greenwood Village, CO (US)

(73) Assignee: Prove Identity, Inc., New York, NY (US)

( * ) Notice: Subject to any disclaimer, the term of this patent is extended or adjusted under 35 U.S.C. 154(b) by 233 days.

(21) Appl. No.: 17/747,214

(22) Filed: May 18, 2022

(65) Prior Publication Data

US 2022/0377065 A1   Nov. 24, 2022

Related U.S. Application Data

(60) Provisional application No. 63/190,668, filed on May 19, 2021.

(51) Int. Cl.
*H04L 9/40* (2022.01)

(52) U.S. Cl.
CPC ............................... *H04L 63/0815* (2013.01)

(58) Field of Classification Search
CPC .................................................. H04L 63/0815
See application file for complete search history.

(56) References Cited

U.S. PATENT DOCUMENTS 6,049,712 A   4/2000  Wallinder
8,145,561 B1  3/2012  Zhu
(Continued)

FOREIGN PATENT DOCUMENTS

EP       1197928      4/2002
KR    20060077541      7/2006
(Continued)

OTHER PUBLICATIONS

Matsunaka et al., "Device Authentication and Registration Method Assisted by a Cellular System for User-driven Service Creation Architecture"; https://ieeexplore.ieee.org/document/478473, 2009 6th IEEE Consumer Communications and Networking Conference; Jan. 10-13, 2009, 5 pages.
(Continued)

*Primary Examiner* — Ayoub Alata
(74) *Attorney, Agent, or Firm* — Husch Blackwell LLP; Bryan D. Stewart; Matthew C. Francis

(57) ABSTRACT

Briefly, example methods, apparatuses, and/or articles of manufacture may be implemented, in whole or in part, to authenticate a communications device. In an embodiment, the method may include accessing a prepackaged group of computer instructions and invoking an authentication operation of the communications device. The method may additionally include determining availability of a cellular communications channel to communicate with a client server and initiating a browser session to pass hardware-specific parameters to and from the client server. The method may further include receiving an outcome of the authentication operation, in which invoking of the authentication operation and receiving the outcome of the authentication operation occur during a single exchange between a client application and the prepackaged group of computer instructions.

26 Claims, 4 Drawing Sheets

(56) References Cited

U.S. PATENT DOCUMENTS

| | | |
|---|---|---|
| 8,489,635 B1 | 7/2013 | Phoha |
| 8,606,640 B2 | 12/2013 | Brody |
| 9,275,345 B1 | 3/2016 | Song |
| 9,706,406 B1 | 7/2017 | Adams |
| 9,747,596 B2 | 8/2017 | Brody |
| 9,767,449 B2 | 9/2017 | Brody |
| 9,906,954 B2 | 2/2018 | McClement |
| 10,078,743 B1 | 9/2018 | Baldi |
| 10,135,614 B2 | 11/2018 | Roberts |
| 10,438,200 B1 | 10/2019 | Griffith |
| 10,501,267 B1 | 12/2019 | Chinoy |
| 10,531,295 B2 | 1/2020 | McClement |
| 10,824,703 B1 | 11/2020 | Desai |
| 10,867,025 B2 | 12/2020 | Whaley |
| 11,159,940 B2 | 10/2021 | Richard |
| 11,176,231 B2 | 11/2021 | Whaley |
| 11,184,350 B2 | 11/2021 | Mainali |
| 11,297,459 B2 | 4/2022 | Raduchel |
| 2001/0037254 A1 | 11/2001 | Glikman |
| 2002/0052754 A1 | 5/2002 | Joyce |
| 2002/0143634 A1 | 10/2002 | Kumar |
| 2003/0212601 A1 | 11/2003 | Silva |
| 2004/0010541 A1* | 1/2004 | Allen .................. H04L 63/101 709/227 |
| 2004/0083394 A1 | 4/2004 | Brebner |
| 2004/0243477 A1 | 12/2004 | Mathai |
| 2005/0022034 A1 | 1/2005 | Chaudhari |
| 2005/0075945 A1 | 4/2005 | Hodge |
| 2005/0114020 A1 | 5/2005 | Seto |
| 2006/0161646 A1 | 7/2006 | Chene |
| 2006/0224470 A1 | 10/2006 | Garcia Ruano |
| 2006/0294388 A1 | 12/2006 | Abraham |
| 2007/0027803 A1 | 2/2007 | Brandes |
| 2007/0043664 A1 | 2/2007 | Wilkes |
| 2007/0055623 A1 | 3/2007 | Ha |
| 2007/0121580 A1 | 5/2007 | Forte et al. |
| 2007/0256122 A1 | 11/2007 | Foo |
| 2007/0288377 A1 | 12/2007 | Shaked |
| 2007/0299728 A1 | 12/2007 | Nemirofsky |
| 2007/0299773 A1 | 12/2007 | Soderstrom |
| 2008/0125117 A1 | 5/2008 | Jiang |
| 2008/0139171 A1 | 6/2008 | Bernath |
| 2008/0140548 A1 | 6/2008 | Csoka |
| 2009/0006254 A1 | 1/2009 | Mumm |
| 2009/0112872 A1 | 4/2009 | Doi |
| 2010/0042835 A1 | 2/2010 | Lee |
| 2010/0210242 A1 | 8/2010 | Caudevilla |
| 2010/0235276 A1 | 9/2010 | Smith |
| 2011/0022477 A1 | 1/2011 | Hatridge |
| 2012/0164978 A1 | 6/2012 | Conti |
| 2012/0197786 A1 | 8/2012 | Brown |
| 2012/0321087 A1 | 12/2012 | Fleischman |
| 2013/0117181 A1 | 5/2013 | Isaacson |
| 2013/0132717 A1 | 5/2013 | Brand et al. |
| 2013/0294284 A1* | 11/2013 | Popa .................. H04L 61/4511 370/254 |
| 2014/0101044 A1 | 4/2014 | Blackhurst |
| 2014/0289833 A1 | 9/2014 | Briceno |
| 2014/0317734 A1 | 10/2014 | Valencia |
| 2014/0372762 A1 | 12/2014 | Flautner |
| 2015/0038120 A1 | 2/2015 | Larkin |
| 2015/0093048 A1 | 4/2015 | Smith |
| 2015/0135310 A1 | 5/2015 | Lee |
| 2015/0170230 A1 | 6/2015 | Panchal |
| 2015/0205957 A1 | 7/2015 | Turgeman |
| 2015/0215305 A1 | 7/2015 | Wetzel et al. |
| 2015/0242601 A1 | 8/2015 | Griffiths |
| 2015/0332031 A1 | 11/2015 | Mistry |
| 2016/0012465 A1 | 1/2016 | Sharp |
| 2016/0050203 A1 | 2/2016 | Hefetz |
| 2016/0057139 A1* | 2/2016 | McDonough ......... H04L 63/168 726/6 |
| 2016/0057623 A1 | 2/2016 | Dutt |
| 2016/0103996 A1 | 4/2016 | Salajegheh |
| 2016/0110528 A1 | 4/2016 | Gupta |
| 2016/0180068 A1 | 6/2016 | Das |
| 2016/0182503 A1 | 6/2016 | Cheng |
| 2016/0278664 A1 | 6/2016 | Pant |
| 2016/0197918 A1 | 7/2016 | Turgeman |
| 2016/0295512 A1 | 9/2016 | Hara |
| 2016/0330199 A1 | 10/2016 | Weiner |
| 2016/0342784 A1 | 11/2016 | Beveridge |
| 2016/0350591 A1 | 12/2016 | Kraft |
| 2017/0063852 A1 | 3/2017 | Azar |
| 2017/0085564 A1 | 3/2017 | Giobbi |
| 2017/0085565 A1 | 3/2017 | Sheller |
| 2017/0199588 A1 | 7/2017 | Ahn |
| 2017/0289168 A1 | 10/2017 | Bar |
| 2017/0337364 A1 | 11/2017 | Whaley |
| 2018/0078179 A1 | 3/2018 | Deng |
| 2018/0121921 A1 | 5/2018 | Woo |
| 2018/0181741 A1 | 6/2018 | Whaley |
| 2019/0245851 A1 | 8/2019 | Whaley |
| 2019/0251534 A1 | 8/2019 | Desai |
| 2019/0281442 A1 | 9/2019 | Kim et al. |
| 2019/0295006 A1 | 9/2019 | Zises |
| 2019/0325445 A1 | 10/2019 | Anderson et al. |
| 2019/0349767 A1 | 11/2019 | Rolfe |
| 2019/0370777 A1 | 12/2019 | Brody |
| 2020/0092723 A1 | 3/2020 | McClement |
| 2020/0104829 A1 | 4/2020 | Arora et al. |
| 2020/0134151 A1 | 4/2020 | Magi |
| 2020/0162515 A1 | 5/2020 | Dubinsky |
| 2020/0252218 A1 | 8/2020 | Wexler |
| 2020/0258084 A1 | 8/2020 | Henderson |
| 2020/0260258 A1 | 8/2020 | Desai |
| 2020/0304985 A1 | 9/2020 | Gupta |
| 2020/0342086 A1 | 10/2020 | Oung |
| 2020/0351818 A1 | 11/2020 | Park |
| 2022/0004611 A1 | 1/2022 | Whaley |
| 2022/0045852 A1 | 2/2022 | Isshiki et al. |
| 2022/0075856 A1 | 3/2022 | Whaley |
| 2022/0374864 A1 | 11/2022 | Agarwal |

FOREIGN PATENT DOCUMENTS

| | | |
|---|---|---|
| KR | 20070121618 | 12/2007 |
| KR | 20080003760 | 1/2008 |
| WO | WO-2016038203 A1 * | 3/2016 ........... G05B 19/418 |

OTHER PUBLICATIONS

PCT Application No. PCT/US2022/029852 / International Search Report and Written Opinion dated Oct. 6, 2022, 12 pages.

U.S. Appl. No. 17/674,627 / Non-Final Office Action dated Nov. 10, 2022, 21 pages.

U.S. Appl. No. 17/225,964 / Notice of Publication dated Oct. 13, 2022, 1 page.

U.S. Appl. No. 17/674,627 / Notice of Publication dated Jul. 28, 2022, 1 page.

U.S. Appl. No. 17/570,335 / Notice of Publication dated Jul. 7, 2022, 1 page.

U.S. Appl. No. 17/225,964 / Response to Non-Final Office Action filed Jun. 6, 2022, 11 pages.

U.S. Appl. No. 17/225,964 / Non-Final Office Action dated Aug. 24, 2022, 19 pages.

Anonymous, Method and Apparatus for Mobile Identity Authentication, Publication Date Mar. 29, 2010, 71 pages.

"Get Real-Time Feedback From Your Customers, without the Need for an Internet Connection" USSD Notifications HTTPS://txtnation.com/mobile-messaging/USSD-notifications/, accessed Jun. 9, 2021 5 pages.

Carr, "Mobile Payment Systems and Services: An Introduction", Mobile Payment Forum, 2007, 12 pages.

Karnouskos et al., "Mobile Payments: A journey through Existing Procedures and Standardization Initiatives," IEEE communications Surveys and Tutorials, Fourth Quarter, vol. 6, Nov. 2004, 23 pages.

Petrova, "Mobile Payment: Towards a Customer-Centric Model", Web Information Systems Engineering—WISE Workshops, Sep. 2008, 13 pages.

(56) References Cited

OTHER PUBLICATIONS

Rahimian, et al, "MPaySmart: A Customer Centric Approach in Offering Efficient Mobile Payments," IEEE Asia-Pacific Services Computing Conference, Dec. 2008, 6 pages.
Soghoian, et al "Merx: Secure and Privacy Preserving Delegated Payments," Second International Trusted Computing Conference, Apr. 2009, 23 pages.
U.S. Appl. No. 14/518,765 / Patent Application filed Oct. 20, 2014, 86 pages.
U.S. Appl. No. 14/518,765 / Filing Receipt mailed Oct. 27, 2014, 4 pages.
U.S. Appl. No. 14/518,765 / Notice of Publication mailed Apr. 21, 2016, 1 page.
U.S. Appl. No. 14/518,765 / Non-Final Office Action mailed May 17, 2017, 49 pages.
U.S. Appl. No. 14/518,765 / Response to Non-Final Office Action filed Jun. 9, 2017, 27 pages.
U.S. Appl. No. 14/518,765 / Notice of Allowance mailed Oct. 11, 2017, 25 pages.
U.S. Appl. No. 14/518,765 / Issue Fee Payment and 312 Amendment filed Jan. 10, 2018, 27 pages.
U.S. Appl. No. 14/518,765 / Amendment After Allowance Initialed by Examiner mailed Jan. 16, 2018, 1 page.
U.S. Appl. No. 14/518,765 / Issue Notification mailed Feb. 7, 2018, 1 page.
U.S. Appl. No. 15/867,630, / US Application filed Jan. 10, 2018, 101 pages.
U.S. Appl. No. 15/867,630, / Notice to File Missing Parts mailed Feb. 1, 2018, 3 pages.
U.S. Appl. No. 15/867,630, / Filing Receipt mailed Feb. 1, 2018, 3 pages.
U.S. Appl. No. 15/867,630, / Response to Missing Parts and Preliminary Amendment, filed Mar. 30, 2018, 22 pages.
U.S. Appl. No. 15/867,630, / Updated Filing Receipt mailed Apr. 3, 2018, 4 pages.
U.S. Appl. No. 15/867,630, / Notice of Publication mailed Jul. 12, 2018, 1 page.
U.S. Appl. No. 15/867,630, / Non-Final Office Action mailed Oct. 11, 2018, 95 pages.
U.S. Appl. No. 15/867,630, / Response to Non-Final Office Action filed Feb. 11, 2019, 27 pages.
U.S. Appl. No. 15/867,630, / Final Office Action mailed Apr. 18, 2019, 28 pages.
U.S. Appl. No. 15/867,630, / Response to Final Office Action and AFCP Request filed Jul. 18, 2019, 28 pages.
U.S. Appl. No. 15/867,630, / Terminal Disclaimer filed and accepted Aug. 6, 2019, 7 pages.
U.S. Appl. No. 15/867,630, / Notice of Allowance/Allowability mailed Aug. 20, 2019, 26 pages.
U.S. Appl. No. 15/867,630, / Supplemental Notice of Allowability and Examiner Interview Summary mailed Nov. 6, 2019, 9 pages.
U.S. Appl. No. 15/867,630, / Issue Fee Payment and 312 Response dated Nov. 11, 2019, 8 pages.
U.S. Appl. No. 15/867,630, / Supplemental Notice of Allowability and Examiner Interview Summary mailed Nov. 29, 2019, 10 pages.
U.S. Appl. No. 15/867,630, / Issue Notification dated Dec. 18, 2019, 1 page.
U.S. Appl. No. 16/691,490 / US Patent Application filed Nov. 21, 2019, 98 pages.
U.S. Appl. No. 16/691,490 / Filing Receipt mailed Dec. 10, 2019, 5 pages.
U.S. Appl. No. 16/691,490 / Non-final Office Action dated Aug. 6, 2020, 54 pages.
U.S. Appl. No. 16/691,490 / Response to Non-final Office Action and Terminal Disclaimer dated Aug. 6, 2020, 23 pages.
U.S. Appl. No. 16/691,490 / Final Office Action dated Jan. 14, 2021, 37 pages.
U.S. Appl. No. 16/691,490 / Amendment and AFCP Request filed Mar. 15, 2021, 18 pages.
U.S. Appl. No. 16/691,490 / Advisory Action mailed Mar. 22, 2021, 4 pages.
U.S. Appl. No. 16/691,490 / Request for Continued Examination and Amendment filed Apr. 14, 2021, 21 pages.
U.S. Appl. No. 16/691,490 / Office Action mailed May 24, 2021, 67 pages.
U.S. Appl. No. 16/691,490 / Amendment filed Aug. 24, 2021, 17 pages.
U.S. Appl. No. 16/691,490 / Notice of Allowance/Allowability dated Nov. 26, 2021, 18 pages.
U.S. Appl. No. 16/691,490 / Request for Updated Filing Receipt filed Feb. 3, 2022, 18 pages.
U.S. Appl. No. 16/691,490 / Updated Filing Receipt dated Feb. 8, 2022, 4 pages.
U.S. Appl. No. 16/691,490 / Request for Corrected Filing Receipt dated Feb. 10, 2022, 26 pages.
U.S. Appl. No. 16/691,490 / Corrected Filing Receipt dated Feb. 14, 2022, 4 pages.
U.S. Appl. No. 16/691,490 / Issue Fee Payment and 312 Response filed Jan. 23, 2022, 6 pages.
U.S. Appl. No. 16/691,490 / Issue Notification dated Mar. 16, 2022, 1 page.
U.S. Appl. No. 17/674,627 / Patent Application filed Feb. 17, 2022, 88 pages.
U.S. Appl. No. 17/674,627 / Filing Receipt and Notice to File Missing Parts dated Feb. 25, 2022, 6 pages.
U.S. Appl. No. 17/674,627 / Preliminary Amendment and Response to Notice to File Missing Parts filed Apr. 14, 2022, 13 pages.
U.S. Appl. No. 17/674,627 / Updated Filing Receipt dated Apr. 18, 2022, 4 pages.
U.S. Appl. No. 17/570,335 / US Patent Application filed Jan. 6, 2022, 65 pages.
U.S. Appl. No. 17/570,335 / Filing Receipt dated Jan. 20, 2022, 4 pages.
PCT Application PCT/US22/11725 / PCT Application filed Jan. 7, 2022, 61 pages.
PCT Application PCT/US22/11725 / International Search Report and Written Opinion dated Mar. 30, 2022, 15 pages.
U.S. Appl. No. 17/225,964 / US Patent Application filed Apr. 8, 2021, 81 pages.
U.S. Appl. No. 17/225,964 / Filing Receipt dated Apr. 16, 2021, 3 pages.
U.S. Appl. No. 17/225,964 / Non-final Office Action dated May 2, 2022, 32 pages.
U.S. Appl. No. 17/225,964 / Examiner Interview Summary dated May 27, 2022, 3 pages.
PCT/US22/29852 / PCT Application filed May 18, 2022, 61 pages.
U.S. Appl. No. 17/410,918 / US Patent Application filed Aug. 24, 2021, 79 pages.
U.S. Appl. No. 17/410,918 / Filing Receipt dated Sep. 3, 2021, 4 pages.
U.S. Appl. No. 15/600,140 / US Patent Application filed May 19, 2017, 49 pages.
U.S. Appl. No. 15/600,140 / Filing Receipt dated Jun. 5, 2017, 3 pages.
U.S. Appl. No. 15/600,140 / Notice of Publication dated Nov. 23, 2017, 1 page.
U.S. Appl. No. 15/600,140 / Restriction Requirement dated May 24, 2019, 6 pages.
U.S. Appl. No. 15/600,140 / Response to Restriction Requirement dated May 28, 2019, 11 pages.
U.S. Appl. No. 15/600,140 / Non-final Office Action dated Sep. 11, 2019, 11 pages.
U.S. Appl. No. 15/600,140 / Terminal Disclaimer and Response to Non-final Office Action dated Dec. 11, 2019, 19 pages.
U.S. Appl. No. 15/600,140 / Final Office Action dated Jan. 7, 2020, 19 pages.
U.S. Appl. No. 15/600,140 / Terminal Disclaimer, Request for Continued Examination and Amendment filed Apr. 7, 2020, 24 pages.
U.S. Appl. No. 15/600,140 / Non-final Office Action dated Jun. 10, 2020, 21 pages.

(56) References Cited

OTHER PUBLICATIONS

U.S. Appl. No. 15/600,140 / Response to Non-final Office Action dated Sep. 2, 2020, 15 pages.
U.S. Appl. No. 15/600,140 / Final Office Action dated Dec. 2, 2020, 23 pages.
U.S. Appl. No. 15/600,140 / Response to Final Office Action dated Dec. 28, 2020, 12 pages.
U.S. Appl. No. 15/600,140 / Advisory Action dated Jan. 8, 2021, 6 pages.
U.S. Appl. No. 15/600,140 / Request for Continued Examination and Amendment filed Jan. 15, 2021, 22 pages.
U.S. Appl. No. 15/600,140 / Non-final Office Action dated Feb. 21, 2021, 22 pages.
U.S. Appl. No. 15/600,140 / Response to Non-final Office Action filed Apr. 16, 2021, 16 pages.
U.S. Appl. No. 15/600,140 / Notice of Allowance / Allowability dated Jul. 8, 2021, 16 pages.
U.S. Appl. No. 15/600,140 / Issue Fee Payment and Request for Corrected Filing Receipt filed Oct. 8, 2021, 28 pages.
U.S. Appl. No. 15/600,140 / Corrected Filing Receipt filed Oct. 12, 2021, 4 pages.
U.S. Appl. No. 15/600,140 / Corrected Notice of Allowability dated Oct. 20, 2021, 5 pages.
U.S. Appl. No. 15/600,140 / Issue Notification dated Oct. 27, 2021, 1 page.
U.S. Appl. No. 17/527,083 / US Patent Application filed Nov. 15, 2021, 62 pages.
U.S. Appl. No. 17/527,083 / Filing Receipt dated Nov. 30, 2021, pages.
U.S. Appl. No. 17/527,083 / Notice of Publication dated Mar. 10, 2022, 1 page.
U.S. Appl. No. 17/475,191 / US Divisional Patent Application filed Sep. 14, 2021, 61 pages.
U.S. Appl. No. 17/475,191 / Filing Receipt dated Sep. 27, 2021, 4 pages.
U.S. Appl. No. 17/475,191 / Notice of Publication dated Jan. 6, 2022, 1 page.
U.S. Appl. No. 15/905,607 / US Patent Application filed Feb. 26, 2018, 58 pages.
U.S. Appl. No. 15/905,607 / Filing Receipt mailed Mar. 23, 2018, 4 pages.
U.S. Appl. No. 15/905,607 / Notice of Publication mailed Jun. 28, 2018, 1 page.
U.S. Appl. No. 15/905,607 / Issue Fee Payment filed Nov. 6, 2018, 6 pages.
U.S. Appl. No. 15/905,607 / Office Action mailed Nov. 14, 2019, 35 pages.
U.S. Appl. No. 15/905,607 / Terminal Disclaimer and Amendment filed Feb. 14, 2020, 25 pages.
U.S. Appl. No. 15/905,607 / Final Office Action mailed May 14, 2020, 30 pages.
U.S. Appl. No. 15/905,607 / Request for Continued Examination and Amendment filed Aug. 13, 2020, 26 pages.
U.S. Appl. No. 15/905,607 / Notice of Allowance/Allowability mailed Sep. 25, 2020, 22 pages.
U.S. Appl. No. 15/905,607 / Issue Fee Payment filed Nov. 6, 2020, 6 pages.
U.S. Appl. No. 15/905,607 / Issue Notification mailed Nov. 24, 2020, 1 Page.
U.S. Appl. No. 16/385,776 / US Patent Application filed Apr. 16, 2019, 46 pages.
U.S. Appl. No. 16/385,776 / Filing Receipt mailed Apr. 30, 2019, 5 pages.
U.S. Appl. No. 16/385,776 / Notice of Publication mailed Aug. 8, 2019, 1 page.
U.S. Appl. No. 16/385,776 / Office Action mailed Nov. 19, 2020, 42 Pages.
U.S. Appl. No. 16/385,776 / Amendment filed Dec. 28, 2020, 22 pages.
U.S. Appl. No. 16/385,776 / Final Office Action mailed Mar. 29, 2021, 38 pages.
U.S. Appl. No. 16/385,776 / Request for Continued Examination and Amendment filed Jun. 4, 2021, 26 pages.
U.S. Appl. No. 16/385,776 / Office Action mailed Sep. 15, 2021, 34 pages.
U.S. Appl. No. 16/385,776 / Response to Office Action filed Dec. 15, 2021, 23 pages.
U.S. Appl. No. 16/385,776 / Examiner Interview Summary dated Jan. 5, 2022, 2 pages.
U.S. Appl. No. 16/385,776 / Terminal Disclaimer and Request for Corrected Filing Receipt filed Jan. 6, 2022, 26 pages.
U.S. Appl. No. 16/385,776 / Notice of Allowance/Allowability dated Feb. 2, 2022, 9 pages.
U.S. Appl. No. 16/385,776 / Issue Fee Payment and 312 Amendment filed Apr. 28, 2022, 20 pages.
U.S. Appl. No. 16/385,776 / Examiner Response to 312 Amendment dated May 4, 2022, 3 pages.
U.S. Appl. No. 16/385,776 / Issue Notification dated Jun. 1, 2022, 1 page.
PCT Application PCT/US2022/011725 / Demand & Response to Written Opinion filed Oct. 31, 2022, 14 pages.
PCT Application PCT/US2022/023938 / PCT Application filed Apr. 7, 2022, 71 pages.
PCT Application PCT/US2022/023938 / International Search Report and Written Opinion dated May 17, 2022, 11 pages.
U.S. Appl. No. 17/674,627 / Response to Non-Final Office action dated Feb. 10, 2023, 12 pages.
U.S. Appl. No. 18/188,847 / US Patent Application filed Mar. 23, 2023, 80 pages.
U.S. Appl. No. 17/225,964 / Response to Non-Final Office Action filed Nov. 23, 2022, 15 pages.
U.S. Appl. No. 17/225,964 / Final Office Action dated Mar. 3, 2023, 33 pages.
U.S. Appl. No. 17/410,918 / Notice of Publication dated Mar. 2, 2023, 1 page.
U.S. Appl. No. 18/188,847 / Filing Receipt and Informational Notice to Applicant dated Jan. 14, 2023, 5 pages.
U.S. Appl. No. 17/674,627 / Terminal Disclaimer filed May 26, 2023, 5 pages.
U.S. Appl. No. 17/674,627 / Notice of Allowance and Allowability dated Jun. 8, 2023, 20 pages.
U.S. Appl. No. 18/188,847 / Non-Final Office Action dated Jun. 21, 2023, 22 pages.
U.S. Appl. No. 18/188,847 / Notice of Publication issued Jul. 20, 2023, 1 page.
U.S. Appl. No. 17/225,964 / Response to Final Office Action & AFCP Request filed May 3, 2023, 23 pages.
U.S. Appl. No. 17/225,964 / Advisory Action issued Jun. 2, 2023, 10 pages.
U.S. Appl. No. 17/225,964 / RCE & Amendment filed Jul. 3, 2023, p. 27.
U.S. Appl. No. 17/410,918 / Non-Final Office Action issued Jun. 1, 2023, 52 pages.

* cited by examiner

SINGLE-EXCHANGE AUTHENTICATION OF A COMMUNICATIONS DEVICE

BACKGROUND

1. Field

The present disclosure relates generally to performing electronic transactions, such as by way of an electronic communications device, which may involve verifying or proving that an individual is currently in possession of, or at least co-located with, a particular communications device.

2. Information

The World Wide Web or simply the Web, as enabled by the Internet, has grown rapidly in recent years at least partially in response to the relative ease by which a wide variety of transactions can be performed or enabled via the Internet by way of a communications device. As a consequence of widely available Internet connections, including connections to the Internet facilitated by mobile cellular communication services, for example, a mobile subscriber may shop and/or browse for virtually any product, service, and/or experience utilizing a communications device. However, in such an environment, in which electronic- and/or Internet-based commerce has become increasingly common, occurrences of fraud and deception, unfortunately, can also occur. As devices typically utilized for communicating and/or performing Internet-based electronic transactions, such as smart phones, tablet computing devices, laptop computers, etc., become increasingly sophisticated, techniques for accomplishing fraud utilizing such devices have also become more sophisticated. Techniques for accomplishing fraud may involve use of and/or knowledge of complex technology, for example, which may be related to the particular hardware and/or software platforms associated with such smart phones, tablets, laptop computers, etc.

To reduce the instances of fraud and deception, fraud-protection processes and/or procedures may be implemented. Such implementations may be utilized, for example, in connection with everyday online or electronic transactions, which may include financial transactions, establishment of lines of credit, in-store purchases for goods and/or services, or the like. Thus, it may be appreciated that reducing instances of fraud and deception, which may involve, for example, use of various electronic devices, continues to be an active area of investigation.

SUMMARY

One general aspect involves a communications device, which includes a prepackaged group of computer instructions encoded on a non-transitory storage medium, which, when executed by one or more processors of the communications device operate to invoke an authentication operation of the communications device. The prepackaged group of computer instructions also operate to determine whether the authentication operation is capable of utilizing a cellular communications channel to communicate with a client server. The prepackaged group of computer instructions also operate to initiate a browser session to pass hardware-specific parameters to and from the client server. The prepackaged group of computer instructions also operate to receive an outcome of the authentication operation. In the general aspect, invoking of the authentication operation and receiving the outcome of the authentication operation occur during a single exchange between a client application and the prepackaged group of computer instructions.

In particular embodiments, the authentication operation is invoked responsive to receipt of an input signal from a user interface of the communications device. In particular embodiments, the communications device is to determine whether the authentication operation is capable of utilizing a cellular communications channel responsive to the one or more processors of the communications device detecting availability of a socket that corresponds to a cellular communications network. In particular embodiments, in response to determining whether the authentication operation is capable of utilizing the cellular communications channel, the prepackaged group of computer instructions operates to force the authentication operation to occur via the cellular communications channel. In particular embodiments, the browser session is initiated without user input. In particular embodiments, the browser session is initiated responsive to receipt of a network location by the prepackaged group of computer instructions. In particular embodiments, the network location corresponds to a uniform resource locator of an authentication server. In particular embodiments, the single exchange between the client application and the prepackaged group of computer instructions includes a single function call. In particular embodiments, the authentication operation is invoked following creation of an authentication object by the prepackaged group of computer instructions.

Another general aspect involves a method of authenticating a communications device, which includes accessing a prepackaged group of computer instructions. The method also includes invoking an authentication operation of the communications device and determining availability of a cellular communications channel to communicate with a client server. The method also includes initiating a browser session to pass hardware-specific parameters to and from the client server. The method also includes receiving an outcome of the authentication operation. In the general aspect, the invoking of the authentication operation and the receiving of the outcome of the authentication operation occur during a single exchange between a client application and the prepackaged group of computer instructions.

In particular embodiments, the method may further include forcing the authentication operation to be conducted via the cellular communications channel based, at least in part, on the determined availability of the cellular communications channel. In particular embodiments, invoking of the authentication operation is responsive to receipt of an input signal from a user interface of the communications device. In particular embodiments, initiating the browser session occurs without user input. In particular embodiments, the browser session is initiated responsive to receipt of a network location by the prepackaged group of computer instructions. In particular embodiments, the network location corresponds to a uniform resource locator of an authentication server. In particular embodiments, the single exchange between the client application and the prepackaged group of computer instructions includes a single function call. In particular embodiments, invoking the authentication operation follows creation of an authentication object by the prepackaged group of computer instructions.

Another general aspect involves an article, which includes a non-transitory storage medium, having prepackaged computer instructions stored thereon, which, when executed by one or more processors of a communications device operate to invoke an authentication operation of the communications device. The prepackaged computer instructions also operate to determine whether the authentication operation is capable of utilizing a cellular communications channel to communicate with a client server. The prepackaged computer instructions also operate to initiate a browser session to pass hardware-specific parameters to and from the client server and receive an outcome of the authentication operation. In the general aspect, invoking of the authentication operation and receiving the outcome of the authentication operation occur during a single exchange between a client application and the prepackaged computer instructions.

In particular embodiments, the prepackaged computer instructions may operate to invoke the authentication operation responsive to receipt of an input signal from a user interface of the communications device. In particular embodiments, the prepackaged computer instructions may operate to direct the communications device to determine whether the authentication operation is capable of utilizing the cellular communications channel responsive to the one or more processors of the communications device detecting availability of a socket that corresponds to a cellular communications network. In particular embodiments, the prepackaged computer instructions may operate to force the authentication operation to be conducted via the cellular communications channel based, at least in part, on the capability of utilizing the cellular communications channel to communicate with the client server. In particular embodiments, the prepackaged computer instructions may direct the browser session to be initiated without user input. In particular embodiments, the prepackaged computer instructions may direct the browser session to be initiated responsive to receipt of a network location by the prepackaged computer instructions. In particular embodiments, the network location corresponds to a uniform resource locator of an authentication server. In particular embodiments, the single exchange between the client application and the prepackaged computer instructions includes a single function call. In particular embodiments, the prepackaged computer instructions operate to invoke the authentication operation following creation of an authentication object by the prepackaged computer instructions.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
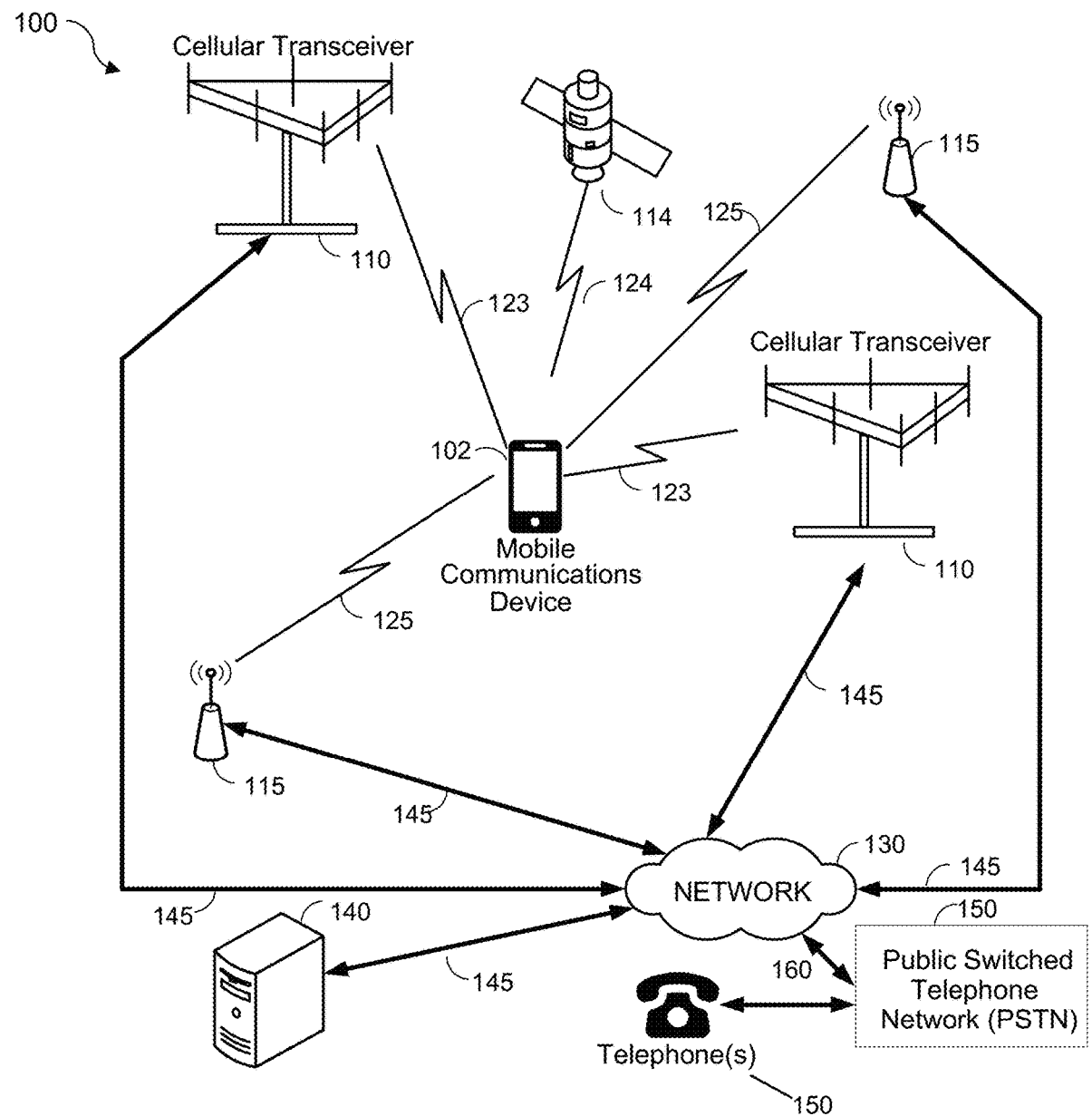
FIG. 1 is a diagram of a telecommunications infrastructure, according to various embodiments.

Reference is made in the following detailed description to the accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, of course, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, in an environment in which electronic communications devices, such as mobile cellular communications devices, voice over Internet protocol (VoIP) communications devices, etc., are ubiquitous, a user of an electronic communications device may wish to perform an electronic or digital transaction. Such transactions may involve completing and/or submitting an application for credit, engaging in an electronic financial transaction, purchasing a product and/or service, completing and/or submitting a loan application, completing and/or submitting one or more forms involved with applying for healthcare coverage (such as in connection with visiting a health provider's office), and/or engaging in a number of other types of transactions via an electronic communications device (or, more simply, a "communications device"). To facilitate these types of transactions, for example, a subscriber co-located with a communications device may establish an identity, such as may be established in connection with a communications device subscriber account with a cellular or mobile communications device services carrier, a VoIP services provider, or other type of communication services carrier. Establishment of an account associated with a communications device, utilizing, for example, a subscriber account identifier (e.g., a cellular telephone number), may permit an individual attempting to engage in an electronic or digital transaction to be authenticated, authorized, and/or verified. In some instances, in view of the nature of electronic or digital transactions, such as in an environment in which electronic or digital transactions are initiated via a communications network at any time and at any location, it may be useful to verify and/or authenticate a user relatively quickly, such as in a real-time fashion, for example.

In many instances, it may be useful to verify and/or authenticate a user utilizing a slimmed-down or streamlined process involving reduced or minimal user input. In some instances, an electronic communications device that supports or facilitates a slimmed-down or streamlined process for authenticating a user may reduce a possibility for user error in manipulating a communications device to bring about authentication. In other instances, an electronic communications device that supports or facilitates a slimmed-down or streamlined process for authenticating a user may permit authentication in a manner that enhances the consumer's purchasing experience as well as increases a merchant's ability to convey goods and services to a consumer without the consumer encountering significant delays in obtaining credit approval, processing loan applications, processing gift cards, etc. In still other instances, utilizing a slimmed-down or streamlined process to authenticate a user may permit the user to rapidly obtain his or her own medical records, as well as to permit a healthcare provider, for example, to quickly and expeditiously provide health-related parameters that may increase patient safety, ensure rapid delivery of healthcare, reduce cost, and so forth.

As a general matter, verification of possession of a communications device by a transacting party such as a party proximate or co-located with a communications device, may be desirable in response to a client institution or organization (e.g., a financial institution, a brokerage, a healthcare provider, etc.) seeking to determine and/or prove identity of the transacting party (e.g., a mobile subscriber). Proving possession (or at least gaining a threshold level of confidence of possession) of a communications device, as such relates to a transacting party, may involve establishing a correspondence between the transacting party and a subscriber account identifier. In this context, correspondence, association, and/or similar terms refer to a persistent, continuing, and objectively verifiable relationship between the transacting party in possession of, for example, a particular communications device, such as a mobile communications device. Thus, a unique subscriber account identifier may be employed to signify and/or identify a particular transacting party. In this context, the term "mobile communications device identity" and/or similar terms refer to an identity that leverages a mobile communications device account relationship (also referred to as a correspondence and/or association) of a subscriber as a source of authentication, authorization, and/or verification of a transacting party. Also in this context, the term "mobile subscriber device account" and/or similar terms refer to a mobile communication services provider account. The terms "mobile communications device services provider," "mobile communications device carrier," and "mobile network operator" are used interchangeably. Furthermore, in this context, the term "mobile device services carrier," "telecommunication services carrier" or "services carrier" refer to an entity of a communications infrastructure that provides wired and/or wireless communication services to the general public for a consideration, such as a monthly subscription fee.

In the context of the present disclosure, a "communication services carrier" may refer to a mobile communication services provider and/or mobile network operator. However, there are examples of carriers that do not correspond to mobile communications device services providers and/or mobile network operators. Such instances may include wireline services providers (for example, providers of services operating within the public switched telephone network or PSTN), which include wireline services for rotary dial telephones and/or telephones utilizing, for example, dual tone multi-frequency (DTMF) signaling. Accordingly, the terms "services carrier" or simply "carrier" may be used in place of a communication services provider and/or wireline telephone services provider without a loss in meaning and/or understanding. In a given situation, particular context of usage should indicate if a term is being used in a general sense or in a narrower sense, such as referring to a mobile communications device services provider, wireline services provider, mobile paging services provider, and/or mobile network operator, for example.

Other aspects of verifying and/or authenticating a mobile subscriber, such as by way of proving that a mobile subscriber is in possession of a communications device, are also described in greater detail hereinbelow. For example, in an embodiment, verifying the identity of and/or authenticating a transacting party may relate to a mobile account and/or a mobile subscriber. Further, a mobile subscriber account is one example of a type of subscriber account, especially in a networked electronic commerce environment, although claimed subject matter is not intended to be limited to online accounts or to mobile accounts. Rather, the term "account" or "subscriber account" in this context refers to a formal business arrangement between an entity, a person, or other party seeking to engage in a transaction, and a provider of the account, so as to accomplish a business purpose, for example. Thus, the term "account" is intended to be broadly interpreted as an arrangement that may provide certain privileges. In this context, privileges may involve access to credit, so as to facilitate the purchase of goods or services, access to secured content, such as premium entertainment content (e.g., premium sports, cinema, or other entertainment content). Also in this context, the term "secured content" is intended to be interpreted broadly so as to encompass any type of content available exclusively to certain individuals and/or certain entities in response to supplying certain credentials. Also in this context the term "parameters" refers numerical or other measurable factors capable of defining a system and/or to set conditions for operation of a system. Thus, for example, a set of parameters may include parameters stored via a non-transitory memory that forms or defines, at least in part, an electronic representation of the state of a mobile subscriber.

Likewise, an account may comprise various attributes. In this context, the term "subscriber account identifier" refers to a unique descriptor or feature associated with the account that defines certain aspects of the account. For example, in nonlimiting illustrations, a subscriber account identifier may refer to (or may at least be associated with) a mobile telephone number, a mobile subscriber unique alias, an international mobile subscriber identifier (IMSI), Integrated Circuit Card Identifier (ICC ID), a mobile services and/or other type of identifier (e.g., a unique identifier) employed in connection with the particular mobile network operator or the mobile communication services provider. Mobile communications networks may include those compatible or compliant with a Global System for Mobile Communications (GSM) telecommunications network, for example. Other examples of mobile subscriber account identifiers may include an International Mobile Equipment Identifier (IMEI), Mobile Station International Subscriber Directory Number (MSISDN), a mobile equipment identifier or any other identifier that may be utilized to identify a mobile billing account number/identifier.

As discussed herein, a subscriber co-located with, or in possession of, a communications device may apply for an account, such as a credit account, for example, or may apply for any other type of account that imparts or confers particular privileges on the subscriber co-located or in possession of the communications device. In other instances, a subscriber co-located with a mobile device may attempt to engage in a financial transaction, for example, or may attempt to access secured information/secured content, just to name a few examples. In many instances, to obtain privilege, such as access to credit, access to secured information (e.g., premium content streaming or other privileged entertainment) a mobile subscriber may be required to complete an application, such as an application for an account, an application for credit, an application for an increase in credit, or may be required to make another type of formal request, which involves the subscriber supplying subscriber-specific parameters. However, as previously alluded to, it may be advantageous for the subscriber, and for the institution providing privileges to the subscriber, for example, to verify or prove that, indeed, the subscriber is co-located with (or is in possession of) a particular communications device. By proving possession of a particular communications device, an institution may reduce the risk of a subscriber engaging in fraudulent behavior by impersonating a particular mobile subscriber and/or by obtaining another subscriber's mobile phone, such as by theft or by any other type of unscrupulous behavior. Further, by way of a communications device utilizing a streamlined or slimmed-down process of authenticating a user may permit rapid fraud detection which may result in the expeditious termination of a potentially fraudulent transactions.

Thus, in particular embodiments, proving possession of a communications device may enhance the rapid detection of an unscrupulous individual's completion of a fraudulent financial transaction, such as transactions involving credit applications, increases in credit lines, purchases, asset sales, access to premium content, or the obtaining of any other type of privileges via fraud and/or deception. In particular embodiments, proving possession of a communications device may involve initiating a browser session via the communications device, in which the device is directed to connect or establish contact with an authenticator via a resource locator, such as a uniform resource locator (URL). During such a browser session, which may be without significant involvement by a subscriber in possession of or co-located with a particular communications device, an application program, executing by way of a processor coupled to at least one memory of the communications device, may obtain or derive specific communications device parameters directly, and without user input, from memory elements within the device. Communications device parameters may comprise those accessed from a subscriber identity module (SIM), or from any other memory or parameter storage location accessible by a processor of the communications device. In some instances, by way of obtaining parameters stored in a SIM of the communications device, for example, under the direction of a browser program operating on the device, an authenticator can be assured that the subscriber operating the communications device is, indeed, in possession of the particular communications device.

In particular embodiments, a streamlined or slimmed-down process for authenticating a communications device may involve use of a prepackaged group of computer instructions, which may be referred to, at least in particular instances, as a software development kit (SDK). In particular embodiments, a SDK may refer to a prepackaged set of computer-readable instructions executed by a processor which permit a particular developer, such as a bank, financial institution, healthcare provider, financial services provider, etc., to implement an application or "app" on a particular communications device. In particular embodiments, use of a prepackaged group of computer instructions may permit various types of communications devices, such as mobile communications devices, to operate consistently and to provide a consistent interface to a client server. Accordingly, a given financial institution, for example, may be capable of supporting various types of financial transactions, conducted by a wide range of users utilizing various types of communications devices, such as mobile communications devices. Further, a prepackaged group of computer instructions may permit various institutions, such as banks, brokerages, healthcare providers etc., to provide applications or "apps," which may operate on mobile communications devices, so as to permit uniform operation across a wide variety of communications device types.

Responsive to an authenticator having proved (or at least having gained at least a threshold level of confidence) that an assumed or purported subscriber is, indeed, in possession of a particular communications device, a financial institution, for example, may be confident that a verified and/or authenticated individual is attempting to engage in a transaction. Conversely, in response to an authenticator determining that an assumed or purported subscriber is likely not in possession of a particular communications device (or cannot be proven to be in possession of a particular communications device), a financial institution, for example, may elect to terminate a financial transaction, for example.

Further, an authenticator may utilize parameters obtained from a specific communications device to access one or more records relating to historical events with respect to the particular communications device. In particular embodiments, records relating to historical events relative to the particular communications device may be indicative of the reputation of the communications device. Thus, responsive to an authenticator obtaining records relating to historical events relevant to the particular communications device, the authenticator may report a measure of trust or trustworthiness with respect to a particular communications device. In some instances, a financial institution, for example, may utilize measures of trust or trustworthiness of a particular communications device to influence whether particular transactions should be permitted to take place. For example, responsive to an authenticator reporting a relatively low measure of trust or trustworthiness of a communications device, a financial institution may permit only low-value transactions (e.g., less than $100) to take place. In another example, responsive to an authenticator reporting a relatively high measure of trust or trustworthiness of a particular communications device, a financial institution may permit transactions of virtually any value to take place.

Thus, particular embodiments of claimed subject matter may allow a financial institution to be assured that an unscrupulous individual, who might be impersonating the owner of the particular communications device, for example, cannot complete a financial transaction. In many instances, a capability to rapidly preclude unscrupulous individuals from engaging in fraudulent financial transactions, such as by way of the fraudulent impersonation of a particular communications device account holder, operates to protect legitimate account holders as well as financial institutions, content providers, healthcare institutions, and so forth. In addition, following an authenticator verifying and/or authenticating a particular subscriber, such as by way of determining that the subscriber is in possession of a specific communications device, particular embodiments of claimed subject matter may permit an authenticator to report to a financial institution, for example, a measure of trust and/or trustworthiness of a particular communications device. By way of reporting trust and/or trustworthiness to a financial institution, certain types of transactions may be permitted to occur while other types of transactions may be disallowed. Preventing fraudulent transactions may bring about a reduction in instances of identity theft, fraud related to credit cards and/or other instruments, circumventing of parental controls, pirating of exclusive entertainment content, and so forth.

In particular embodiments, a method of proving possession of a communications device may proceed in response to a subscriber (purportedly or assumed to be in possession of the communications device) invoking or activating an application (e.g., an app) on a communications device, such as a mobile communications device. Such invoking may, at least in certain embodiments, signal that a subscriber is attempting to initiate a financial transaction, initiate accessing of secured content, etc. Invoking an application on a communications device may signal a client server, such as a server managed by a financial institution, bank, healthcare provider, etc., and may be facilitated by the application utilizing a prepackaged group of computer instructions (e.g., a SDK). In response to the subscriber contacting the institution, via the SDK communicating with the client server, the client server may communicate with an authenticator, which may operate to prove that a particular subscriber is, indeed, in possession of a certain mobile communications device. Such proof may enable the authenticator to verify, authorize, and/or audit the identity of the subscriber. As a part of a process to authenticate, verify, and/or authorize a transaction involving the subscriber, the client server of the institution may participate in directing the communications device, in the possession of the subscriber, to establish a connection, such as via the Internet, with a website, for example, under the control of the client server. In particular instances, such a browser connection to the Internet may be made without requiring the user of the communications device to execute particular actions. Following establishing a browser session between the communications device and the client server, as facilitated by, for example, the SDK, parameters of the communications device may be exchanged within a secure environment that exists between the client server and the authenticator. In this manner, a client mobile application, via the SDK, may obtain authentication via the client server by way of a secure communications channel formed between the client server and the authenticator, such as a cellular communications channel. In particular embodiments, the SDK may force, ensure, or otherwise guarantee that authentication operations occur (e.g., exclusively) via the cellular communications channel.

Following establishment of a browser session between the authenticator and the client server, the authenticator may direct the communications device to obtain, for example, hardware parameters stored at memory locations within the communications device. In an embodiment, in response to receiving one or more queries from the authenticator, via the client server, the communications device may access a SIM (or other memory device) of the communications device to determine or to obtain specific device parameters. The specific device parameters may be encoded and forwarded to the client server which may, in turn, be forwarded to the authenticator. The authenticator may utilize such device-specific parameters determined or obtained from the communications device so as to permit comparison of the device parameters with corresponding parameters stored in a data store accessible to the authenticator. Responsive to detecting agreement or a match between parameters from the communications device and parameters obtained from the data store, the authenticator may prove the identity of and/or authenticate the subscriber operating the particular communications device.

As previously mentioned, authentication and/or verification of a subscriber may occur in a streamlined or slimmed-down process. Accordingly, prior to engaging in a financial transaction, for example, a user may invoke a client mobile application, which may initiate a single function call or other type of single exchange, utilizing computer-executable instructions to an SDK. An SDK may operate to determine if a communications device can provide hardware parameters stored at memory locations of the communications device via a cellular communications network. Responsive to determining that communications with a client server can occur via a cellular communications network, a communications device may open a secure browser session with a client server, transfer encrypted parameters representative of hardware parameters, for example, and obtain authorization from an authenticator, via a client server, utilizing the single function call or single exchange. In particular instances, use of a single function call or other type of exchange between a client application and an SDK, for example, may facilitate performing a streamlined or slimmed-down process of obtaining authorization of a particular subscriber. Thus, authentication may occur expeditiously, and perhaps with very little involvement of a particular subscriber. Further, in the case of a subscriber attempting to engage in a fraudulent transaction, an authenticator may quickly terminate a potentially fraudulent transaction. Alternatively, an authenticator may assign a relatively low trust or trustworthiness score to a subscriber, which may suggest to a client that the transaction is potentially fraudulent, and should be terminated. In addition, use of a standardized SDK or other type of prepackaged group of computer instructions, may permit development of various client applications, which may operate on a variety of mobile devices, to operate consistently, and with a similar look and feel across the various devices and across the various applications developed for particular (e.g., individual) financial institutions.

As previously noted, in particular embodiments, after verification of the identity of a particular communication services subscriber, an authenticator may access a data store to determine a reputation with respect to a communications device. In particular embodiments, a reputation with respect to a communications device may be negatively impacted (e.g., degraded) responsive to the communications device being associated with one or more risk events. Such risk events may include, but are not limited to, recent porting of a subscriber account identifier (e.g., a telephone number) associated with a communications device, recent replacement of a communications device, a recent request of a one-time-password associated with a communications device, removal/replacement of a SIM of a communications device, as well as any number of additional risk events associated with the device. In particular embodiments, a reputation of a communications device may be positively impacted (e.g., enhanced) responsive to the device having never been ported (or having not been ported for a prolonged period of time), having never undergone removal/replacement of a SIM (or having not undergone such removal/replacement of a SIM for a prolonged period of time), and so forth. It should be noted that claimed subject matter is intended to embrace risk events with respect to a communications device other than these, virtually without limitation.

In particular embodiments, following establishment of a communications link between the communications device and the client server, the device may transmit an indicator, such as an Internet protocol (IP) address without requiring receipt of input signals from a user interface of a communications device. An indicator may comprise, for example, an alphanumeric combination, which may comprise one or more characters of, for example, the English alphabet (26 characters) or any other alphabet. An alphanumeric combination may additionally include digits, such as one or more of digits 0-9, or may include a combination of alphabetical characters (A-Z in the English alphabet) and one or more of digits 0-9. In particular embodiments, an alphanumeric combination transmitted via a communications device may identify a communication services carrier providing communication services to the device. In turn, the client server may convey the indicator received from the communications device to an authenticator utilizing a secure connection. Responsive to receipt of the indicator indicating a communication services carrier providing communication services to the device, and based, at least in part, on the content of the received indicator, the authenticator may formulate and/or generate a session identifier, which may comprise a one-time-use token. The session identifier may be transmitted to the communications device via the client server. In particular embodiments, the formulation and/or generation of a session identifier may be tailored to particular IP addresses, or ranges of IP addresses, which may be indicative of a particular carrier providing services to the communications device. In certain other embodiments, formulation and/or generation of a session identifier may be tailored in accordance with a particular service carrier as indicated by an alphanumeric combination (e.g., "XYZ" or "MOBILE1" wireless services).

In particular embodiments, a session identifier may be arranged or positioned within a resource locator, such as a URL, which may be transmitted to a communications device. Following receipt of the session identifier by the communications device, the device may be directed or pointed to a location corresponding to the authenticator. Such directing or pointing may occur without involvement of a subscriber in possession of the communications device. The authenticator may then revoke the session identifier so as to ensure that the session identifier cannot be reused, such as by a fraudulent actor who may attempt to operate another communications device. Upon revoking the session identifier, the authenticator may initiate a browser session with the communications device, which may involve generation of at least one additional session identifier comprising one or more one-time-use tokens. During a browser session, an identify verifier may transmit one or more an additional session identifiers comprising one or more additional one-time-use tokens to a communications device. While a browser session is in progress, and under the direction of, for example, an application program interface (API) cooperating with an SDK or other prepackaged group of computer instructions, the communications device may access or determine one or more stored parameters from a SIM (or other memory location) internal to the communications device. Alternatively, or in addition to, an API may derive communications device-specific from memory devices within, or under the control of, the communications device.

Such parameters may then be transmitted, via the client server, to the authenticator during the browser session. In particular embodiments, by way of an authenticator receiving one or more stored parameters from a SIM of the communications device, the authenticator can have relatively high confidence, or actual proof, that the subscriber is, indeed, in possession of a particular communications device. Accordingly, the authenticator can be assured that a trustworthy, verified, and/or authenticated account holder is attempting to engage in a transaction, such as a financial transaction, rather than an unscrupulous individual attempting to engage in a fraudulent transaction. Following transmission of one or more stored parameters from a SIM of the communications device, and following verification and/or authentication, the communications device may be directed back to the client server of the financial institution.

Although the discussion that follows relates to any type of account, in nonlimiting illustrations, accounts corresponding to communications devices may be used for illustration. However, it is understood that claimed subject matter is intended to not be limited to examples provided primarily for purposes of illustration, since such examples may be oversimplified for purposes of comprehension, for example.

As previously alluded to, in particular instances, a mobile subscriber may attempt to access a bank account via a voice call, a web browser, or by utilizing a computer process executing by way of a processor coupled to at least one memory of a communications device, for example, which may permit the mobile subscriber to engage in a financial transaction. Hence, a bank, lender, brokerage firm, or any other type of financial institution, in response to an attempt to access the bank account, may employ an application programming interface (API) substantially compatible and/or substantially compliant with HTTP and/or HTTPS, including versions now known and/or to be later developed, and/or another suitable protocol (e.g., now known and/or to later be developed). In such examples, a user may seek to take one or more actions with respect to an account, such as, for example, establishing an account, updating a credit value (e.g., credit limit) for an account, transferring funds, viewing a history of electronic or digital transactions, updating privileged content and/or parameters, or engaging in other activities involving secured content.

In FIG. 1 communications device 102 may transmit radio signals to, and receive radio signals from, a wireless communications network in accordance with various embodiments, such as embodiment 100. In an example, communications device 102 may communicate with a cellular communications network by transmitting wireless signals to, and/or receiving wireless signals from, a cellular transceiver 110, which may comprise a wireless base transceiver subsystem (BTS), a Node B or an evolved NodeB (eNodeB), over wireless communication link 123. Similarly, communications device 102 may transmit wireless signals to, and/or receive wireless signals from, local transceiver 115 over wireless communication link 125. A local transceiver 115 may comprise an access point (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth® network) or a cellular network (e.g. an LTE network or other wireless wide area network, such as those discussed herein). Of course, it should be understood that these are merely examples of networks that may communicate with a mobile device over a wireless link, and claimed subject matter is not limited in this respect. In particular embodiments, cellular transceiver 110, local transceiver 115, satellite 114, and PSTN 150 represent touchpoints, which permit communications device 102 to interact with network 130.

Examples of network technologies that may support wireless communication link 123 are GSM, Code Division Multiple Access (CDMA), Wideband CDMA (WCDMA), Long Term Evolution LTE), High Rate Packet Data (HRPD). GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB. Cellular transceivers 110 may comprise deployments of equipment providing subscriber access to a wireless telecommunication network for a service (e.g., under a service contract). In the embodiment of FIG. 1, a cellular transceiver 110 may perform functions of a cellular base station in servicing subscriber devices within a cell determined based, at least in part, on a range at which the cellular transceiver 110 is capable of providing access service. Examples of radio technologies that may support wireless communication link 125 are IEEE 802.11, BT and LTE.

In a particular implementation, cellular transceiver 110 and local transceiver 115 may communicate with server 140, such as by way of network 130 via communication links 145. Here, network 130 may comprise any combination of wired or wireless links and may include cellular transceiver 110 and/or local transceiver 115 and/or server 140. In a particular implementation, network 130 may comprise Internet Protocol (IP) or other infrastructure capable of facilitating communication between communications device 102 at a call source and server 140 through local transceiver 115 or cellular transceiver 110. In an embodiment, network 130 may also facilitate communication between communications device 102, server 140 and a PSTN 150, for example through communications link 160. In another implementation, network 130 may comprise a cellular communication network infrastructure such as, for example, a base station controller or packet based or circuit based switching center (not shown) to facilitate mobile cellular communication with communications device 102. In a particular implementation, network 130 may comprise local area network (LAN) elements such as WiFi APs, routers and bridges and may, in such an instance, comprise links to gateway elements that provide access to wide area networks such as the Internet. In other implementations, network 130 may comprise a LAN and may or may not involve access to a wide area network but may not provide any such access (if supported) to communications device 102. In some implementations, network 130 may comprise multiple networks (e.g., one or more wireless networks and/or the Internet). In one implementation, network 130 may include one or more serving gateways or Packet Data Network gateways. In addition, one or more of server 140 may comprise an E-SMLC, a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs) of network 130.

In particular embodiments, communications between communications device 102 and cellular transmitter 110, satellite 114, local transceiver 115, and so forth may occur utilizing signals communicated across wireless communications channels. Accordingly, the term "signal" may refer to communications utilizing propagation of electromagnetic waves across wireless communications channels. Signals may be modulated to convey messages utilizing one or more techniques such as amplitude modulation, frequency modulation, binary phase shift keying (BPSK), quaternary phase shift keying (QPSK) along with numerous other modulation techniques, and claimed subject matter is not limited in this respect. Accordingly, as used herein, the term "messages" refers to parameters, such as binary signal states, which may be encoded in a signal using one or more of the above-identified modulation techniques.

In particular implementations, and as discussed below, communications device 102 may comprise circuitry and processing resources capable of obtaining location related measurements (e.g. for signals received from GPS or other Satellite Positioning System (SPS) satellites 114), cellular transceiver 110 or local transceiver 115 and possibly computing a position fix or estimated location of communications device 102 based on these location related measurements. In some implementations, location related measurements obtained by communications device 102 may be transferred to a location server such as an enhanced serving mobile location center (E-SM LC) or SUPL location platform (SLP) (e.g. which may comprise a server, such as server 140) after which the location server may estimate or determine an estimated location for communications device 102 based on the measurements. In the presently illustrated example, location related measurements obtained by communications device 102 may include measurements of signals (124) received from satellites belonging to an SPS or Global Navigation Satellite System (GNSS) such as GPS, GLONASS, Galileo or Beidou and/or may include measurements of signals (such as 123 and/or 125) received from terrestrial transmitters fixed at known locations (e.g., such as cellular transceiver 110).

Communications device 102 or a separate location server may obtain a location estimate for communications device 102 based on location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at communications device 102 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at communications device 102. Here, server 140 may be capable of providing positioning assistance data to communications device 102 including, for example, information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 140 may comprise an almanac to indicate locations and identities of cellular transceivers and/or local transceivers in a particular region or regions such as a particular venue, and may provide information descriptive of signals transmitted by a cellular base station or AP such as transmission power and signal timing. In the case of E-CID, communications device 102 may obtain measurements of signal strengths for signals received from cellular transceiver 110 and/or local transceiver 115 and/or may obtain a round trip signal propagation time (RTT) between communications device 102 and a cellular transceiver 110 or local transceiver 115. A communications device 102 may use these measurements together with assistance data (e.g. terrestrial almanac data or GNSS satellite data such as GNSS Almanac and/or GNSS Ephemeris information) received from server 140 to determine a location estimate for communications device 102 or may transfer the measurements to server 140 to perform the same determination. A call from communications device 102 may be routed, based on the location of communications device 102, and connected to PSTN 150, for example, via wireless communication link 123 and communications link 160.

A mobile device at a call source (e.g., communications device 102 of FIG. 1) may be referred to by any name corresponding to a cellphone, smartphone, laptop, tablet, PDA, tracking device or some other portable or movable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., communications device 102) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level).

The architecture of the cellular communications network described in relation to FIG. 1 may comprise a generic architecture that is capable of accommodating a variety of outdoor and indoor location solutions including the standard SUPL user plane location solution defined by the Open Mobile Alliance (OMA) and standard control plane location solutions defined by 3GPP and 3GPP2. For example, server 140 may function as (i) a SUPL location platform to support the SUPL location solution, (ii) an E-SMLC to support the 3GPP control plane location solution with LTE access on wireless communication link 123 or 125, or (iii) a Stand-alone Serving Mobile Location Center (SAS) to support the 3GPP Control Plane Location solution for UMTS.

Figure 2:
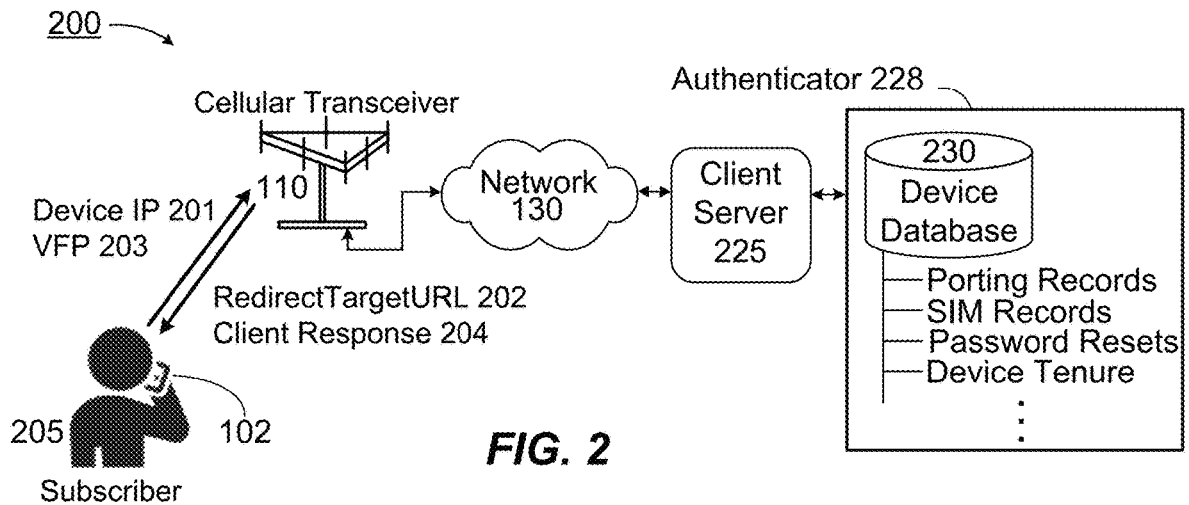
FIG. 2 shows a subscriber in possession of a communications device to permit interaction with a client server and an authenticator, according to an embodiment.

In view of the communications infrastructure shown and described in reference to FIG. 1, more particular embodiments directed toward reducing the risk of fraud and deception involving a subscriber account identifier that corresponds to the subscriber's communications device are discussed hereinbelow. Thus, FIG. 2 shows a subscriber in possession of a communications device to permit interaction with a client server and an authenticator, according to an embodiment 200. In the embodiment of FIG. 2, mobile subscriber 205 may be located at any point within communications range of cellular transceiver 110. As shown in FIG. 2, communications device 102 may be wirelessly coupled to cellular transceiver 110. Cellular transceiver 110 may be coupled to client server 225 via intervening network 130. In turn, client server 225 may include a secure connection between itself and authenticator 228. It should be noted, however, that claimed subject matter is not limited exclusively to wireless communications between device 102 and cellular transceiver 110. For example, in particular embodiments, communications device 102 may communicate with client server 225 by way of one or more intervening Wi-Fi or wireline telephone services (e.g., the public switched telephone network).

Subscriber 205 may engage (or may at least attempt to engage) in a financial transaction via client server 225, which may signify a bank (or other type of financial institution), a healthcare provider, a content provider, or any other type of entity that may, at least from time to time, require verification, authentication, and/or auditing of subscriber 205 prior to permitting a transaction to take place. Accordingly, subscriber 205 may initiate a transaction involving client server 225 utilizing, for example, communications device 102. In the embodiment of FIG. 2, subscriber 205 may establish a browser session, such as a browser session utilizing a mobile (wireless) Internet service provider, with client server 225. During such a browser session, which may be initiated without input from subscriber 205, communications device 102 may transmit, convey, or otherwise signal an intent to engage in a transaction, such as a financial transaction, via client server 225.

Figure 3:
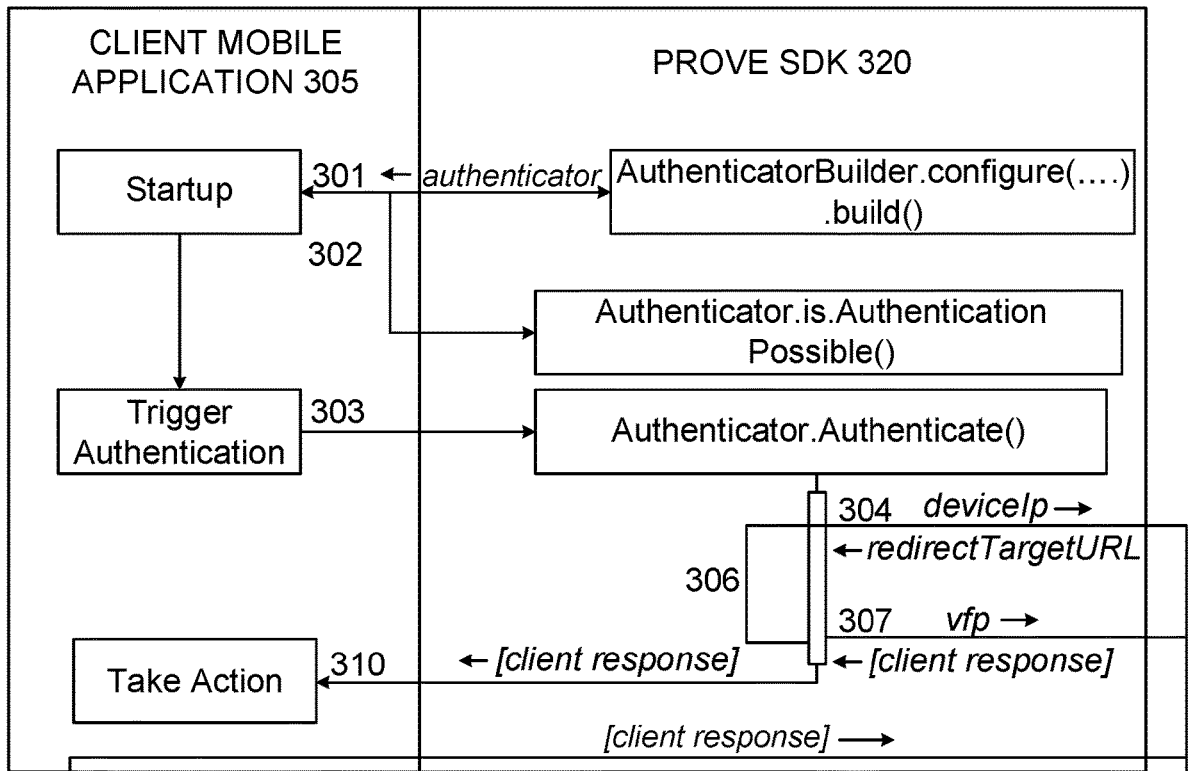
FIG. 3 is a diagram showing message flow between and/or among an application implementable on a communications device, a prepackaged group of computer instructions, a client server, and an authenticator, according to an embodiment.
Figure 3:
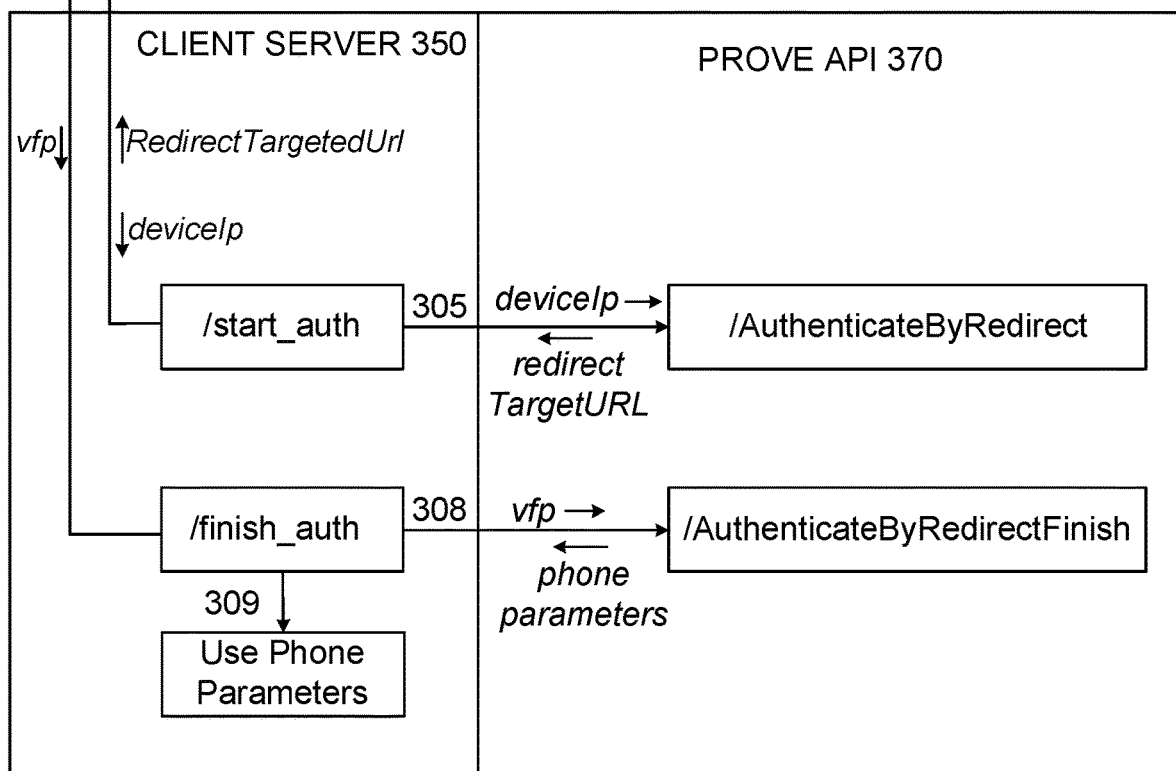

In embodiment 200, communications device 102 may engage in a financial transaction utilizing a client mobile application, which may be supported and/or facilitated by a SDK or other type of prepackaged group of computer instructions. Communications device 102 may employ numerous applications which may permit various types of financial and/or brokerage transactions, access to premium entertainment content, access to medical records, and so forth. Some or all of the above-identified applications may utilize the same or similar SDK, for example, so as to provide a consistent look and feel across at least certain types of client mobile applications. In particular embodiments, use of the same or a similar SDK, or other type of prepackaged group of computer instructions, may provide similar performance benefits. In embodiment 200, one performance benefit, which may be discussed in greater detail in reference to FIG. 3, is the single-exchange feature between a client application and the SDK. As will be discussed in greater detail in reference to FIG. 3, an authentication process involving mobile communications device 102 may be invoked, as well as receiving an outcome of the authentication process, in response to a single function call or single exchange between a client application and an SDK.

Returning now to FIG. 2, responsive to client server 225 receiving, for example, a transmission signaling an intent of subscriber 205 to initiate a transaction, client server 225 may communicate with authenticator 228 utilizing one or more secure connections, such as a connection utilizing a cellular communications network. Authenticator 228 may operate to verify, authenticate, and/or audit subscriber 205 so as to determine a reputation of communications device. Thus, authenticator may utilize parameters obtained from communications device 102 to access one or more records relating to historical events relevant to device 102. Accordingly, authenticator 228 may access device database 230 to obtain account information comprising the name, address, phone number, and other parameters of subscriber 205. Authenticator 228 may additionally obtain historical records of deterministic events with respect to communications device 102. In some embodiments, authenticator 228 may access device database 230 so as to permit computing of a trustworthiness score or other measure of trustworthiness, with respect to communications device 102. A trustworthiness score or trustworthiness measure may be based, at least in part, on historical records relating to instances of reassignment or porting of subscriber account identifiers (e.g., a telephone number) from a first communication services carrier to a second communication services carrier. A trustworthiness score or trustworthiness measure may be based, at least in part, on tenure of communications device 102, which may relate to a period of time subscriber 205 has owned, leased, or utilized services of a carrier to provide communication services to device 102. A trustworthiness score or trustworthiness measure may be based, at least in part, on whether device 102 has undergone a SIM removal/replacement. A trustworthiness score or trustworthiness measure may be based, at least in part, on whether device 102 has undergone a password or personal identification number reset, such as via a one-time password, for example. It should be noted that claimed subject matter is intended to embrace additional contributors to a trustworthiness score or trustworthiness measure, virtually without limitation.

As shown in FIG. 2, communications device 102 may transmit an IP address, shown as Device IP 201 in FIG. 2, which may comprise an IPv4 address or IPv6 address, which indicates an Internet location of communications device 102. Responsive to receiving an indicator (e.g., Device IP 201) from communications device 102, client server 225 may forward the indicator to authenticator 228. Following receipt of the indicator from client server 225, authenticator 228 may utilize the indicator to generate a target resource locator, which may be tailored to the logical location of communications device 102. For example, responsive to an indicator from communications device 102 indicating an IP address within a particular range of IP addresses, authenticator 228 may determine that device 102 is capable of operating (e.g., has access to a socket) on a cellular communications network corresponding to carrier "A." Hence, authenticator 228 may generate a targeted resource locator to redirect communications to and from communications device 102, as indicated by RedirectTargetURL 202 in FIG. 2. Authenticator 228 may thus generate a differently-tailored target URLs, which may operate to redirect communications to and from communications device 102. In some instances, such variations in the tailoring of a session identifier may involve placement of certain fields and/or parameters within a resource locator, such as a targeted URL, transmitted to communications device 102. In other instances, such variations in session identifiers may involve types of fields, number of characters in a field, types of characters in a field, or may include any other variations in tailored session identifiers, and claimed subject matter is not limited in this respect.

In another embodiment, an indicator transmitted from communications device 102 to client server 225 may comprise, for example, an alphanumeric combination, which may directly indicate a particular communication services carrier. Responsive to receipt of an alphanumeric combination, authenticator 228 may determine that device 102 is currently operating (e.g., such as by way of a socket) available on a cellular communications network corresponding to carrier "XYZ," for example. Authenticator 228 may thus prepare a tailored session identifier for transmission to communications device 102. For example, responsive to receipt of an alphanumeric combination indicating that device 102 is currently operating via a socket on a cellular communications network corresponding to carrier "ABC," authenticator 228 may prepare a tailored session identifier for transmission to communications device 102. In another example, responsive to receipt of an alphanumeric combination from device 102, indicating that device 102 is currently operating via a socket on a cellular communications network corresponding to carrier "XYZ," authenticator 228 may prepare a differently-tailored session identifier for transmission to communications device 102. Similar to that described above, in some instances, such variations in formulation of a session identifier may involve positioning of certain fields and/or parameters within a resource locator, such as a URL, transmitted to communications device 102. In other instances, such variations in formulation of a session identifier may involve the types of fields, number of characters in a field, types of characters in a field, or may include any other variations in generation of a session identifier, and claimed subject matter is not limited in this respect.

Responsive to receipt of a session identifier from authenticator 228, which may be forwarded to communications device 102, by way of client server 225, network 130, and cellular transceiver 110, device 102 may be redirected to a website under the direction and/or control of authenticator 228. In particular embodiments, such redirection may occur without knowledge and/or without receiving input signals initiated by subscriber 205. Following establishment of a connection, such as a mobile wireless Internet connection, between communications device 102 and authenticator 228, communications device 102 may prepare a verification fingerprint (VFP), which is shown as VFP 203 in FIG. 2. In embodiment 200, the verification fingerprint may represent a hash-based message authentication code (H-MAC), which may represent a keyed-hash message, for example. In embodiments, a VFP may utilize a message authentication code involving a cryptographic hash function and a secret cryptographic key. Accordingly, VFP 203 may be capable of simultaneously verifying both data integrity and authenticity of parameters encoded within the VFP. A VFP may include contents of one or more memory locations internal to communications device 102 and may thus comprise one or more device-specific identifiers. In an embodiment, device-specific identifiers may be unique to a particular communications device 102, such as comprising, an International Mobile Subscriber Identifier (IMSI), an International Mobile Electronic Identifier (IMEI), or a Mobile Station International Subscriber Directory Number (MSISDN), an Integrated Circuit Card Identifier (ICC ID), or any combination thereof.

Following receipt of a VFP, which may include one or more identifiers accessed from locations internal to communications device 102, authenticator 228 may compare received identifiers with one or more stored identifiers by way of accessing device database 230. In response to determining that device-specific parameters obtained from communications device 102 match corresponding parameters stored in device database 230, authenticator 228 may verify and/or authenticate subscriber 205 co-located with communications device 102. Conversely, in response to determining that device-specific parameters obtained from communications device 102 do not match corresponding parameters stored in device database 230, authenticator 228 may determine that subscriber 205 cannot be verified and/or authenticated. Authenticator 228 may additionally indicate that a particular transaction, such as a transaction recently initiated utilizing communications device 102, may be fraudulent.

Following authenticator 228 successfully authenticating the identity of subscriber 205, or, in contrast, following authenticator 228 unsuccessfully authenticating the identity of subscriber 205, authenticator 228 may convey an outcome of an authenticating operation to communications device 102, depicted as Client Response 204 in FIG. 2.

Responsive to receipt of a client response, subscriber 205 may be informed as to whether an authentication of communications device 102 has been successful.

In particular embodiments, after successfully proving that a subscriber is in possession of a particular communications device, authenticator 228 may access device database 230 to determine whether particular deterministic events have occurred with respect to communications device 102. As previously noted, such deterministic events may include, but are not limited to, recent porting of a subscriber account identifier (e.g., a telephone number) associated with communications device 102, recent replacement of a communications device, a recent request of a one-time-password associated with communications device 102, removal/replacement of a SIM of communications device 102, as well as any number of additional risk events associated with communications device 102. Responsive to determining whether such risk events have occurred and, perhaps, a frequency of occurrence of one or more risk events, authenticator 228 may provide client server 225 with a trustworthiness score or trustworthiness measure. In accordance with business rules and/or business logic implemented by an institution directing the operations of client server 225, the transaction initiated by subscriber 205 may be allowed, or may be suspended until further parameters regarding communications device 102 and/or subscriber 205 can be gathered, or may be disallowed entirely.

FIG. 3 is a diagram showing message flow between and/or among an application implementable on a communications device, a prepackaged group of computer instructions, a client server, and an authenticator, according to an embodiment 300. In the embodiment of FIG. 3, a subscriber, such as subscriber 205 of FIG. 2, may be in possession of and/or be co-located with a communications device, such as communications device 102. A subscriber may wish to engage in a transaction, such as a financial transaction, a transaction to obtain secured content (e.g., healthcare records, premium entertainment, etc.), utilizing a communications device. As shown in FIG. 3, a communications device may execute client application 305, which may exchange parameters with Prove SDK 320. In embodiment 300, Prove SDK 320 may represent a prepackaged group of computer instructions, for example. Accordingly, Prove SDK 320 may include libraries, application program interfaces, documentation, predefined objects, and a variety of additional components. In embodiment 300, client application 305 and Prove SDK 320 may both execute utilizing a processor coupled to a memory device of communications device 102.

Device 102 may operate to establish contact with client server 350, which may include a secure connection with Prove API 370. In embodiment 300, client server 350 represents a computing resource, such as a standalone server, which operates within the confines of a particular client, such as a financial institution. Accordingly, client server 350 may represent a relatively secure computing resource with limited general Internet access and may implement additional access and security layers so as to be capable of managing customer financial information, customer health records, customer account information, and so forth. Thus, in embodiment 300, client server 350 and Prove API 370 operate within the confines of a security fence while client application 305 and Prove SDK 320 operate in a relatively unsecure environment.

In embodiment 300, at operation 301, client application 305 may initialize one or more computer objects of Prove SDK 320. Thus, responsive to subscriber 205, for example, selecting an application (e.g., an app) corresponding to a financial institution, Prove SDK 320 may build one or more objects, which may be later used in an authentication process, such as "AuthenticationBuilder.configure( . . . ).build( )" shown in FIG. 3. Building of one or more objects may permit additional, subsequent authorization utilizing previously created objects. At operation 302, which may represent an optional operation, client application 305, cooperating with Prove SDK 320, may determine whether authentication utilizing a socket of a cellular communications network is possible. Accordingly, at operation 302, the function call "authenticator.is.AuthenticationPossible( )" may return a "true" or a "false" in response to determining, for example, that communications device 102 is capable of accessing a socket of a cellular communications network such as, for example, via cellular transceiver 110 of FIGS. 1 and 2.

Following completion of operation 301 and, at least in particular embodiments, operation 302, a subscriber (e.g., subscriber 205) may trigger an authentication at operation 303. In particular embodiments, operation 303 comprises a first portion of a single exchange between client application 305 and Prove SDK 320. In an example, operation 303 represents a single call to the function "authenticator.authenticate( )." At operation 304, in response to receiving a function call, for example, from client application 305, Prove SDK 320 may determine the device Internet protocol address corresponding to a host communications device, such as communications device 102. Following determination of the Internet protocol address, Prove SDK 320 may transmit the message "deviceIp" to client server 350 to a uniform resource locator "/start_auth," which corresponds to a secure resource managed by and under the control of client server 350. In turn, client server 350, via client application 305, may convey the received device Internet protocol address (e.g., "deviceIp") to Prove API 370. Prove API 370 may receive the device Internet protocol address via the URL indicated as "/authenticateByRedirect" as shown. Following Prove API 370 obtaining the received device Internet protocol address, API 370 may return redirect parameters to be utilized by Prove SDK 320, such as the parameter "RedirectTargetUrl." Redirect parameters (e.g., "RedirectTargetUrl.") may be returned via the uniform resource locator "/start_auth," to Prove SDK 320.

Responsive to receipt of redirect parameters from client server 350, Prove SDK 320 may engage in a number of operations unbeknownst to subscriber 205 and/or client application 305. In embodiment 300, such operations may include obtaining one or more device-specific identifiers stored in a memory of communications device 102, such as an IMSI, an IMEI, an MSISDN, an ICC ID, or any combination thereof. In particular embodiments, such operations may additionally include querying of a mobile network operator or other type of communication services carrier. Operations involving obtaining device-specific identifiers, contacting a communication services carrier, as well as other interactions between Prove SDK 320 and memory/processing element of communications device 102, as well as interactions between device 102 and a communication services carrier are referred to in embodiment 300 simply as operation 306. In response to conducting such operations, communications device 102 may generate a verification fingerprint (shown as "vfp" in FIG. 3). In particular embodiments, a verification fingerprint may comprise a hash-based message authentication code, which may comprise a keyed-hash message authentication code and/or a hash-based message authentication code, for example. In embodiments, a verification fingerprint may utilize a message authentication code involving a cryptographic hash function and a secret cryptographic key. A verification fingerprint may comprise a memory cache handle or other type of identifier that includes a checksum, an expiration timestamp, and/or other additional security features. Accordingly, if intercepted such as by an unscrupulous party not in possession of an appropriate key to decrypt and/or decode the contents of the verification fingerprint, the verification fingerprint represents a substantially useless collection of parameters. Thus, the use of, for example, a hash-based message authentication code, such as described herein, may be used outside of the secure environment of client server 350 and Prove API 370 without compromising, for example, personally identifiable information of subscriber 205.

At operation 307, the verification fingerprint (e.g., vfp) is transmitted from communications device 102 to client server 350 utilizing, for example, cellular transceiver 110. Communications device 102 may convey the verification fingerprint utilizing the uniform resource locator indicated as "/finish_auth." At operation 308, client server 350 may obtain the received verification fingerprint such as via resource "/finish_auth," and, in turn, may transmit the verification fingerprint to Prove API 370. Responsive to receipt of the verification fingerprint, Prove API 370 may access a data store to determine a reputation with respect to communications device 102. As previously mentioned, in particular embodiments, a reputation with respect to a communications device may be negatively impacted (e.g., degraded) responsive to the communications device being associated with one or more risk events. Such risk events may include, but are not limited to, recent porting of a subscriber account identifier (e.g., a telephone number) associated with a communications device, recent replacement of a communications device, a recent request of a one-time-password associated with a communications device, removal/replacement of a SIM of a communications device, as well as any number of additional risk events associated with the device. In particular embodiments, a reputation of a communications device may be positively impacted (e.g., enhanced) responsive to the device having never been ported (or having not been ported for a prolonged period of time), having never undergone removal/replacement of a SIM (or having not undergone such removal/replacement of a SIM for a prolonged period of time), and so forth. It should be noted that claimed subject matter is intended to embrace other deterministic events with respect to communications devices, virtually without limitation.

In response to Prove API 370 completing an authentication process of a communications device, Prove API 370 may provide such authentication approval/disapproval, for example, as indicated by the resource "/authenticateByRedirectFinish." The resource "/finish_auth" may of client server 350 may receive the authentication approval/disapproval such as at operation 308. It should be noted that Prove API 370 may provide additional parameters, which may be of use to client server 350, at operation 309. For example, Prove API 370 may include detailed parameters relevant to communications device 102, such as parameters relating to recent porting of a communications device, recent removal/replacement of a SIM of a communications device and so forth. Delivering such additional parameters, rather than just approval/disapproval of a transaction, for example, may provide client server 350 with an opportunity to employ business rules, which may be unique to client server 350. In an example, responsive to Prove API 370 reporting a relatively low measure of trust or trustworthiness of a communications device, a financial institution operating client server 350 may permit only low-value transactions (e.g., less than $100) to take place. In another example, responsive to an Prove API 370 reporting a relatively high measure of trust or trustworthiness of a particular communications device, a financial institution operating client server 350 may permit transactions of virtually any value to take place.

At operation 310, client server 350 may transmit a client response to be received by Prove SDK 320. It should be noted that an outcome of an authentication process, conveyed via operation 310, may be tailored by client server 350. Thus, it in an example, client server 350 may simply transmit a signal indicating "approval" or "disapproval" of the particular transaction. In another example, client server 350 may transmit signals to indicate a credit limit (e.g., $500, $1000, $5000, or some other value). In another example, client server 350 may transmit signals to indicate a balance remaining on a gift card (e.g., $50, $100, $250, or some other number). Accordingly, "client response" indicated in FIG. 3 may include any response determined to be suitable by client server 350, virtually without limitation.

Upon receipt of signals from client server 350, Prove SDK 320 may return a value (e.g., numerical value, text string, etc.) responsive to the single function call to the function "authenticator.authenticate( )" described in reference to operation 303. Thus, it may be appreciated that initiation of a single exchange, such as the exchange represented at operation 303, facilitates a number of operations, such as operations 304-309, that occur unbeknownst to, and without additional input from, a subscriber operating a communications device. Thus, a subscriber may seamlessly engage in a financial transaction, obtain credit approval, obtain access to records, or perform a variety of other types of functions in response to performing minimal user input involving a communications device. It may also be appreciated that as described in reference to FIG. 3, a single exchange (e.g., function call) initiates a variety of operations conducted among Prove SDK 320, client server 350, and Prove API 370, which occur out-of-view of a user (e.g., subscriber 205) of the communications device.

Figure 4:
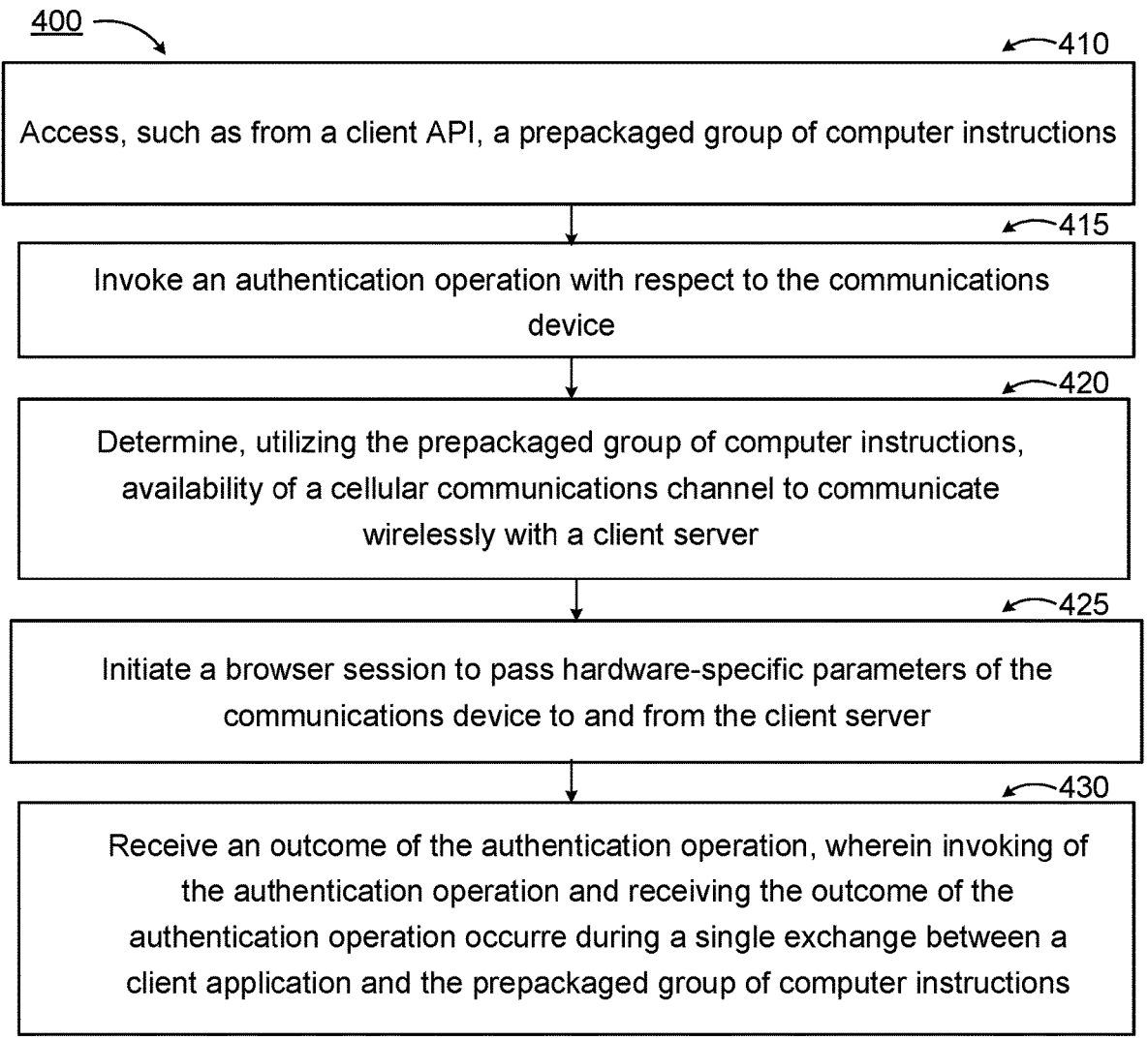
FIG. 4 shows a first process for single-exchange authentication of a communications device, according to an embodiment.

FIG. 4 shows a first process for single-exchange authentication of a communications device, according to an embodiment 400. It should be noted that the disclosed embodiments, such as the process of FIG. 4, are intended to embrace numerous variations, including processes that may include actions in addition to those depicted in the figures, actions performed in an order different than those depicted in the figures, as well as processes including fewer steps than those depicted. The process of FIG. 4 begins at 410, which includes a client application interface, for example, accessing a prepackaged group of computer instructions, such as, for example, a SDK. At 415, a client application program interface may invoke an authentication operation with respect to the communications device. A client application program interface may be invoked in response to a subscriber, for example, attempting to engage in a financial transaction, access medical records, obtain access to premium content, or a variety of other operations related to accessing secured content. 415 may involve a prepackaged group of computer instructions receiving a request to authenticate a communications device.

At 420, a prepackaged group of computer instructions, such as a SDK, may determine availability of a cellular communications channel to communicate wirelessly with a client server. At 425, a SDK, for example, may initiate a browser session to pass hardware-specific parameters of a communications device to the client server. At 430, a SDK, or other type of prepackaged group of computer instructions, may receive an outcome of an authentication operation. It should be noted that the invoking, such as described in reference to 415, and the receiving of the outcome of the authentication operation, such as described in reference to 430, occurred during a single exchange (such as a function call) between a client application and the prepackaged group of computer instructions. Additionally, at least in particular embodiments, authentication may occur exclusively via a cellular communications channel established between a communications device and an authenticator.

Figure 5:
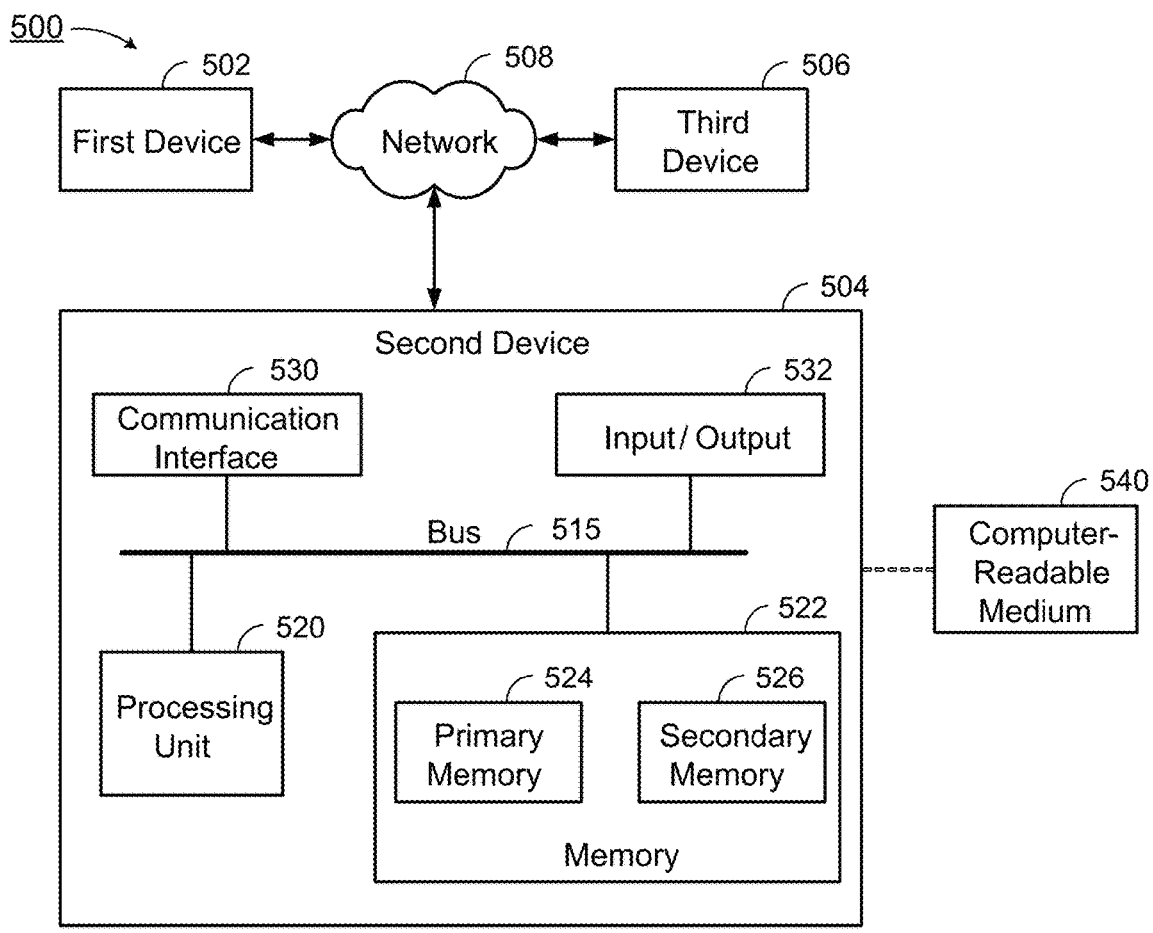
FIG. 5 is a diagram showing a computing environment, according to an embodiment.

FIG. 5 is a diagram showing a computing environment, according to an embodiment 500. In the embodiment of FIG. 6, first and third devices 502 and 506 may be capable of rendering a graphical user interface (GUI) for a network device, such as server device 140 of FIG. 1, so that a subscriber utilizing a communications device (e.g., a mobile communications device) may engage in system use. Device 504 may potentially serve a similar function in this illustration. Likewise, in FIG. 5, computing device 502 ('first device' in FIG. 5) may interface with computing device 504 ('second device' in FIG. 5), which may, for example, also comprise features of a client computing device and/or a server computing device, in an embodiment. Processor (e.g., processing device) 520 and memory 522, which may comprise primary memory 524 and secondary memory 526, may communicate by way of a communication interface 530, for example. The term "computing device," in the context of the present patent application, refers to a system and/or a device, such as a computing apparatus that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 504, as depicted in FIG. 5, is merely one example, and claimed subject matter is not limited in scope to this particular example.

In FIG. 5, computing device 502 may provide one or more sources of executable computer instructions in the form of physical states and/or signals (e.g., stored in memory states), for example. Computing device 502 may communicate with computing device 504 by way of a network connection, such as via network 508, for example. As previously mentioned, a connection, while physical, may be virtual while not necessarily being tangible. Although computing device 504 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar outcomes. Rather, examples are provided merely as illustrations. It is not intended that claimed subject matter be limited in scope to illustrative examples.

Memory 522 may comprise any non-transitory storage mechanism. Memory 522 may comprise, for example, primary memory 524 and secondary memory 526, additional memory circuits, mechanisms, or combinations thereof may be used. Memory 522 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 522 may comprise one or more articles utilized to store a program of executable computer instructions. For example, processor 520 may fetch executable instructions from memory and proceed to execute the fetched instructions. Memory 522 may also comprise a memory controller for accessing device readable-medium 540 that may carry and/or make accessible digital content, which may include code, and/or instructions, for example, executable by processor 520 and/or some other device, such as a controller, as one example, capable of executing computer instructions, for example. Under direction of processor 520, a non-transitory memory, such as memory cells storing physical states (e.g., memory states), comprising, for example, a program of executable computer instructions, may be executed by processor 520 and able to generate signals to be communicated via a network, for example, as previously described. Generated signals may also be stored in memory, also previously suggested.

Memory 522 may store electronic files and/or electronic documents, such as relating to one or more users, and may also comprise a machine-readable medium that may carry and/or make accessible content, including code and/or instructions, for example, executable by processor 520 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 520 may comprise one or more circuits, such as digital circuits, to perform at least a portion of a computing procedure and/or process. By way of example, but not limitation, processor 520 may comprise one or more processors, such as controllers, micro-processors, micro-controllers, application specific integrated circuits, digital signal processors, programmable logic devices, field programmable gate arrays, the like, or any combination thereof. In various implementations and/or embodiments, processor 520 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 504 as including a component 532 operable with input/output devices, and communication bus 515, for example, so that signals and/or states may be appropriately communicated between devices, such as device 504 and an input device and/or device 504 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized outcomes, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more communications devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a client server device and/or a communications device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a communications device and/or a client server device in various embodiments. Network devices capable of operating as a client server, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a communications device, as well as other types of devices, including between wired and/or wireless devices coupled via a wired and/or wireless network, for example, or any combination thereof. It is noted that the terms, server, server device, server computing device, server computing platform and/or similar terms are used interchangeably.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

The term electronic file and/or the term electronic document are used throughout this document to refer to a set of stored memory states and/or a set of physical signals associated in a manner so as to thereby, at least logically, form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). As suggested previously, a computing device and/or a networking device may also have a subscriber identity module (SIM) card, which, for example, may comprise a detachable or embedded smart card that is able to store subscription content of a user, and/or is also able to store a contact list. It is noted, as previously mentioned, that a SIM card may also be electronic in the sense that it may simply be sorted in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a communications device application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A communications device, comprising:
a prepackaged group of computer instructions encoded on a non-transitory storage medium, which, when executed by one or more processors of the communications device operate to:
    invoke an authentication operation of the communications device;
    determine, based on an Internet Protocol (IP) address of the communications device, whether the authentication operation is capable of utilizing a cellular communications channel to communicate with a client server;
    in response to determining that the authentication operation is capable of utilizing the cellular communications channel to communicate with the client server, initiate, via the cellular communications channel, a browser session to pass hardware-specific parameters to and from the client server; and
    receive an outcome of the authentication operation, wherein
    invoking of the authentication operation and receiving the outcome of the authentication operation occur during a single exchange between a client application and the prepackaged group of computer instructions.

2. The communications device of claim 1, wherein the authentication operation is invoked responsive to receipt of an input signal from a user interface of the communications device.

3. The communications device of claim 1, wherein the communications device is to determine whether the authentication operation is capable of utilizing the cellular communications channel responsive to the one or more processors of the communications device detecting availability of a socket that corresponds to a cellular communications network.

4. The communications device of claim 3, wherein, in response to determining whether the authentication operation is capable of utilizing the cellular communications channel, the prepackaged group of computer instructions operates to force the authentication operation to occur via the cellular communications channel.

5. The communications device of claim 1, wherein the browser session is initiated without user input.

6. The communications device of claim 1, wherein the browser session is initiated responsive to receipt of a network location by the prepackaged group of computer instructions.

7. The communications device of claim 6, wherein the network location corresponds to a uniform resource locator of an authentication server.

8. The communications device of claim 1, wherein the single exchange between the client application and the prepackaged group of computer instructions comprises a single function call.

9. The communications device of claim 1, wherein the authentication operation is invoked following creation of an authentication object by the prepackaged group of computer instructions.

10. A method of authenticating a communications device, comprising:
   accessing a prepackaged group of computer instructions;
   invoking of an authentication operation of the communications device;
   determining, based in part on an Internet Protocol (IP) address of the communications device, whether the authentication operation is capable of utilizing a cellular communications channel to communicate with a client server;
   in response to determining that the authentication operation is capable of utilizing the cellular communications channel to communicate with the client server, initiating, via the cellular communications channel, a browser session to pass hardware-specific parameters to and from the client server; and
   receiving an outcome of the authentication operation,
   wherein invoking of the authentication operation and receiving the outcome of the authentication operation occur during a single exchange between a client application and the prepackaged group of computer instructions.

11. The method of claim 10, further comprising:
   forcing the authentication operation to be conducted via the cellular communications channel based, at least in part, on the determined capability of utilizing the cellular communications channel.

12. The method of claim 10, wherein invoking of the authentication operation is responsive to receipt of an input signal from a user interface of the communications device.

13. The method of claim 10, wherein initiating the browser session occurs without user input.

14. The method of claim 10, wherein the browser session is initiated responsive to receipt of a network location by the prepackaged group of computer instructions.

15. The method of claim 14, wherein the network location corresponds to a uniform resource locator of an authentication server.

16. The method of claim 10, wherein the single exchange between the client application and the prepackaged group of computer instructions comprises a single function call.

17. The method of claim 10, wherein invoking the authentication operation follows creation of an authentication object by the prepackaged group of computer instructions.

18. An article comprising a non-transitory storage medium, having prepackaged computer instructions stored thereon, which, when executed by one or more processors of a communications device operate to:
   invoke an authentication operation of the communications device;
   determine, based on an Internet Protocol (IP) address of the communications device, whether the authentication operation is capable of utilizing a cellular communications channel to communicate with a client server;
   in response to determining that the authentication operation is capable of utilizing the cellular communications channel to communicate with the client server, initiate, via the cellular communications channel, a browser session to pass hardware-specific parameters to and from the client server; and
   receive an outcome of the authentication operation,
   wherein invoking of the authentication operation and receiving the outcome of the authentication operation occur during a single exchange between a client application and the prepackaged computer instructions.

19. The article of claim 18, wherein the prepackaged computer instructions operate to invoke the authentication operation responsive to receipt of an input signal from a user interface of the communications device.

20. The article of claim 18, wherein the prepackaged computer instructions operate to direct the communications device to determine whether the authentication operation is capable of utilizing the cellular communications channel responsive to the one or more processors of the communications device detecting availability of a socket that corresponds to a cellular communications network.

21. The article of claim 20, wherein the prepackaged computer instructions additionally operate to force the authentication operation to be conducted via the cellular communications channel based, at least in part, on the determined capability of utilizing the cellular communications channel to communicate with the client server.

22. The article of claim 18, wherein the prepackaged computer instructions direct the browser session to be initiated without user input.

23. The article of claim 18, wherein the prepackaged computer instructions direct the browser session to be initiated responsive to, at least in part, receipt of a network location by the prepackaged computer instructions.

24. The article of claim 23, wherein the network location corresponds to a uniform resource locator of an authentication server.

25. The article of claim 18, wherein the single exchange between the client application and the prepackaged computer instructions comprises a single function call.

26. The article of claim 18, wherein the prepackaged computer instructions operate to invoke the authentication operation following creation of an authentication object by the prepackaged computer instructions.

* * * * *